United States Patent
Chmielewski et al.

(10) Patent No.: US 9,632,662 B2
(45) Date of Patent: Apr. 25, 2017

(54) PLACEMENT OF ITEMS IN RADIAL MENUS

(75) Inventors: Paul R. Chmielewski, Byron, MN (US); Brian J. Cragun, Rochester, MN (US); Michael J. Fork, Gibsonburg, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 12/560,529

(22) Filed: Sep. 16, 2009

(65) Prior Publication Data
US 2011/0066980 A1   Mar. 17, 2011

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01)

(58) Field of Classification Search
CPC ............................ G06F 3/0482; G06F 3/04883
USPC .......................................................... 715/834
See application file for complete search history.

(56) References Cited

U.S. PATENT DOCUMENTS

| | | | | |
|---|---|---|---|---|
| 6,144,378 A | * | 11/2000 | Lee | G06F 3/0236 715/767 |
| 6,285,367 B1 | * | 9/2001 | Abrams | G06F 3/0489 715/841 |
| 7,210,107 B2 | * | 4/2007 | Wecker | G06F 3/04812 715/834 |
| 2009/0019397 A1 | * | 1/2009 | Buffet | G06F 3/0482 715/837 |

* cited by examiner

*Primary Examiner* — Sherrod Keaton
(74) *Attorney, Agent, or Firm* — Patterson + Sheridan, LLP

(57) ABSTRACT

Methods, systems, and articles of manufacture for placing menu items in a radial menu. A radial menu may be displayed in response to receiving a predefined gesture made with a screen pointer. A plurality of global menu items may be placed at predefined locations in the radial menu. A set of local menu items that are to be displayed in the radial menu be determined and displayed in the radial menu based on one or more predefined relationships between the local or global radial menu items.

9 Claims, 23 Drawing Sheets

| GROUP NAME | RADIAL MENU ITEMS | TYPE |
|---|---|---|
| GLOBAL GROUP | PRINT, HELP, SAVE, EXIT | NONE |
| LOCAL GROUP A | ROTATE LEFT, ROTATE RIGHT, SHRINK, MAGNIFY | NONE |
| GROUP B | ROTATE LEFT, ROTATE RIGHT | OPPOSITE |
| GROUP C | SHRINK, MAGNIFY | OPPOSITE |
| GROUP D | SAVE, EXIT | REPEL |
| LOCAL GROUP E | REVIEW, FINALIZE, APPROVE, CREATE | NONE |
| GROUP F | PRINT, HELP, SAVE | AFFINITY |

| GROUP NAME | RADIAL MENU ITEMS | TYPE |
|---|---|---|
| GLOBAL GROUP | PRINT, HELP, SAVE, EXIT | NONE |
| LOCAL GROUP A | ROTATE LEFT, ROTATE RIGHT, SHRINK, MAGNIFY | NONE |
| GROUP B | ROTATE LEFT, ROTATE RIGHT | OPPOSITE |
| GROUP C | SHRINK, MAGNIFY | OPPOSITE |
| GROUP D | SAVE, EXIT | REPEL |
| LOCAL GROUP E | REVIEW, FINALIZE, APPROVE, CREATE | NONE |
| GROUP F | PRINT, HELP, SAVE | AFFINITY |

FIG. 13

PLACEMENT OF ITEMS IN RADIAL MENUS

BACKGROUND OF THE INVENTION

Field of the Invention

The present invention is generally related to graphical user interfaces (GUIs), and more specifically to placing menu items in a radial menu.

Description of the Related Art

Most modern computers include applications that allow a user to interact with the application while performing operations associated with the applications. For example, an application may be configured to receive commands from the user to display data, modify data, initiate a particular task, and the like. In the past, user interaction with applications was facilitated by a command line interface. The command line interface allowed users to type predefined commands to interact with an application. However, command line interfaces require users to memorize large lists of commands to communicate with each application.

More recently, user interaction with applications has involved the use of graphical user interfaces, or GUIs. For example, most applications today are configured to display a window including a menu bar on a display screen. The menu bar may include one or more pull down menus including lists of functions and commands that may be used to interact with the application.

SUMMARY OF THE INVENTION

The present invention is generally related to graphical user interfaces (GUIs), and more specifically to placing menu items in a radial menu.

One embodiment of the invention provides a computer implemented method for displaying radial menu items in a radial menu, comprising configuring one or more processors to perform an operation. The operation generally comprises displaying a radial menu in response to receiving a predefined gesture, displaying a first set of radial menu items in the radial menu, wherein each radial menu item in the first set is displayed at a respective predefined location in the radial menu, and determining a second set of radial menu items to be displayed in the radial menu. The operation further comprises displaying the second set of radial menu items at available locations in the radial menu based on at least one predefined relationship between at least two radial menu items in the first set and the second set.

Another embodiment of the invention provides a computer readable storage medium comprising a program product which, when executed, is configured to perform an operation for displaying radial menu items in a radial menu. The operation generally comprises displaying a radial menu in response to receiving a predefined gesture, displaying a first set of radial menu items in the radial menu, wherein each radial menu item in the first set is displayed at a respective predefined location in the radial menu, and determining a second set of radial menu items to be displayed in the radial menu. The operation further comprises displaying the second set of radial menu items at available locations in the radial menu based on at least one predefined relationship between at least two radial menu items in the first set and the second set.

Yet another embodiment of the invention provides a system, generally comprising a memory comprising a program and a processor. The processor, when executing the program, is configured to display a radial menu in response to receiving a predefined gesture, display a first set of radial menu items in the radial menu, wherein each radial menu item in the first set is displayed at a respective predefined location in the radial menu, and determine a second set of radial menu items to be displayed in the radial menu. The processor is further configured to display the second set of radial menu items at available locations in the radial menu based on at least one predefined relationship between at least two radial menu items in the first set and the second set.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 13 is an exemplary table defining groups of radial menu items according to an embodiment of the invention.

DETAILED DESCRIPTION OF THE PREFERRED EMBODIMENTS

Figure 1:
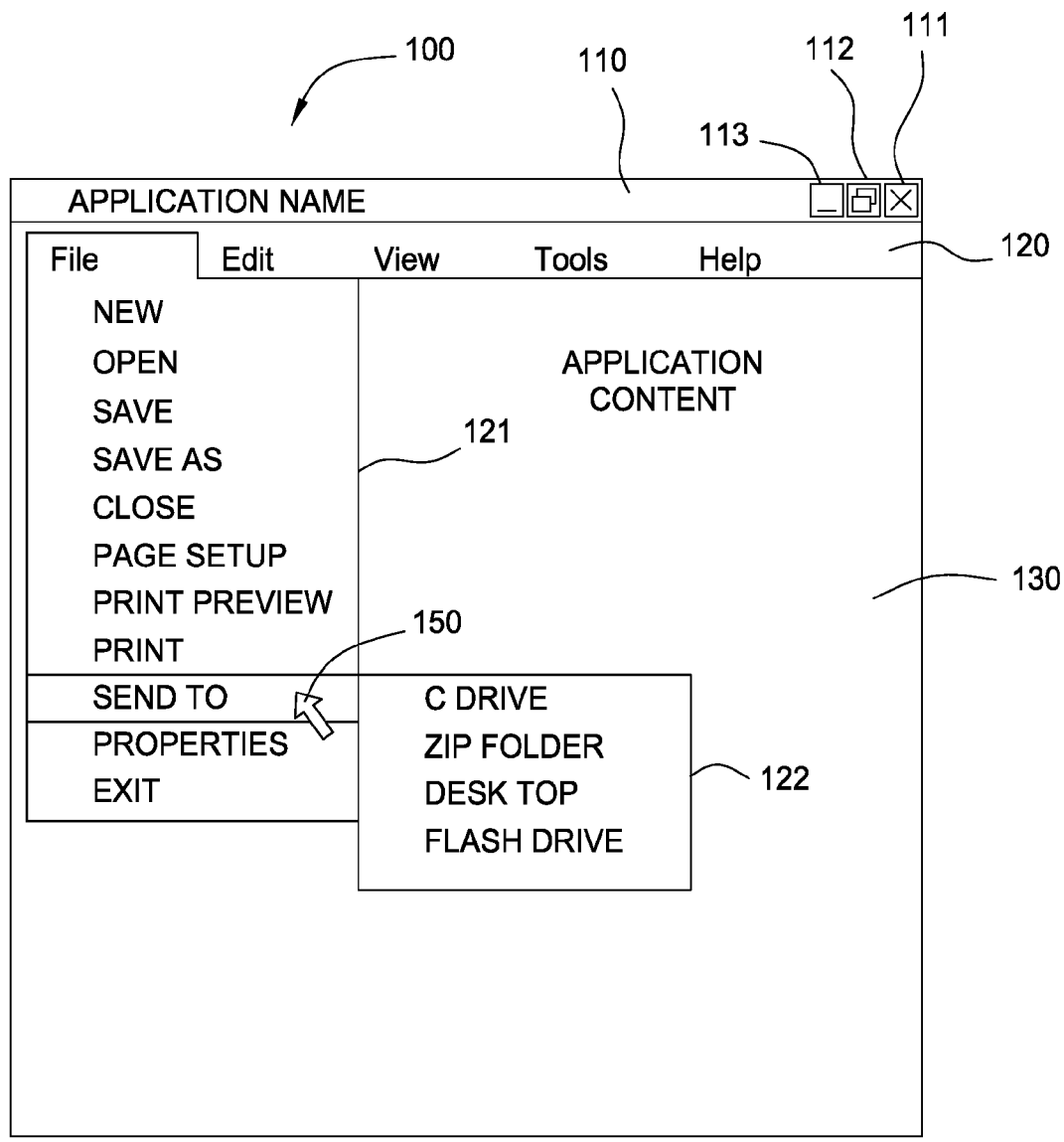
FIG. 1 illustrates a drop-down menu according to the prior art.

Embodiments of the invention are generally related to placing menu items in a radial menu. A radial menu may be displayed in response to receiving a predefined gesture made with a screen pointer. A plurality of global menu items may be placed at predefined locations in the radial menu. A set of local menu items that are to be displayed in the radial menu be determined and displayed in the radial menu based on one or more predefined relationships between the local or global radial menu items.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary graphical user interface (GUI) 100 according to the prior art. GUI 100 may be displayed on a display screen, such as, for example, a computer monitor to facilitate communication between a user and an application. As illustrated in FIG. 1, GUI 100 includes a title bar 110, a menu bar 120, and an application content area 130. The application content area 130 includes graphical representations of application content including text, images, video, spreadsheets, and the like.

The title bar 110 displays the application name and one or more buttons, including a close button 111, a minimize/maximize button 112, and a hide button 113. The close button, when clicked, may be configured to close the application, the minimize/maximize button 112 may be configured to toggle the size of the GUI 100 between two predefined sizes, and the hide button 113 may be configured to make the GUI 100 disappear.

The menu bar 120 includes a plurality of menus including the File menu, Edit menu, View menu, Tools menu, and Help menu, as illustrated in FIG. 1. A particular menu may be selected from the menu bar, for example, by clicking on a desired menu using a mouse. Each of the menus in the menu bar 120 are drop down menus. Therefore, when a particular menu is selected, a list of items in the menu is displayed. FIG. 1, illustrates an exemplary list of items 121 displayed when the File menu is selected.

A particular item may be selected from a drop down menu by moving the mouse pointer vertically up and down the list until the mouse pointer is above a desired item. In some cases a visual indication of the particular item under the mouse pointer may be provided. For example, as illustrated in FIG. 1, a mouse pointer 150 is over the Send To item of the File menu. Therefore, the Send To item is shaded with a different colored background to indicate that the mouse pointer is over the Send To item.

Selecting a menu item may include performing a second mouse click to select the desired item. For example, a first mouse click on a desired menu may display menu items in a drop down list. A user may then move a mouse pointer vertically up and/or down until the mouse pointer is over a desired menu item. A visual indication, for example, shading may indicate the item over which the mouse pointer lies to aid the user in making the selection. Once the mouse pointer is above the desired menu item, a second click of the mouse may result in the selection of the menu item.

In some cases, a menu item may be a sub-menu. For example, the Send To item of the File Menu may be a sub-menu. Accordingly, as illustrated in FIG. 1, moving the mouse pointer over the Send To item may result is a cascaded sub-menu 122 to be displayed. Each cascaded sub-menu may have its own cascaded sub menu, which may result in several cascaded sub-menus being displayed before the desired item is selected.

The GUI 100 provides several advantages over traditional command line interfaces. For example, a user of the GUI 100 need not memorize commands associated with a large number of menu items because he/she may simply explore and navigate the menu items via the menu bar to communicate with the application. However, menu bars and drop down menus are not efficient at allowing a user to quickly select a desired item. First, selecting a menu item requires at least two mouse clicks as described above. Second, in drop down menus having a large number of items, the menu items may be closely spaced, which may require the user to scan up and down along the menu several times before a desired item is found. Furthermore, drop down menus with a large number of closely spaced items have an increased probability of erroneous selection of menu items.

The inefficiency of drop down menus may adversely affect users of applications where a fast response time is desired from the user while interacting with the applications. For example, in a gaming application a user's response time in responding to a particular circumstance in the game may be critical to the user's performance in the game. As an example, in a game where performance is determined by the user's ability to defeat opponents in a fight, the ability of the user to detect and quickly attack opponents may be crucial to performing successfully completing the game.

Embodiments of the invention provide radial menus that allow users to quickly make selections of menu items using simple gestures. A radial menu may be displayed on a display screen in response to detecting a predefined screen pointer event such as a mouse click. Other screen pointer events may include touching the display screen with a finger or stylus pen, pressing one or more keys on a keyboard, receiving a voice command, and the like. Thereafter, a first stroke may be made with the screen pointer to activate a desired radial menu item. A predefined second stroke may be made to select the active radial menu item.

Exemplary System

Figure 2:
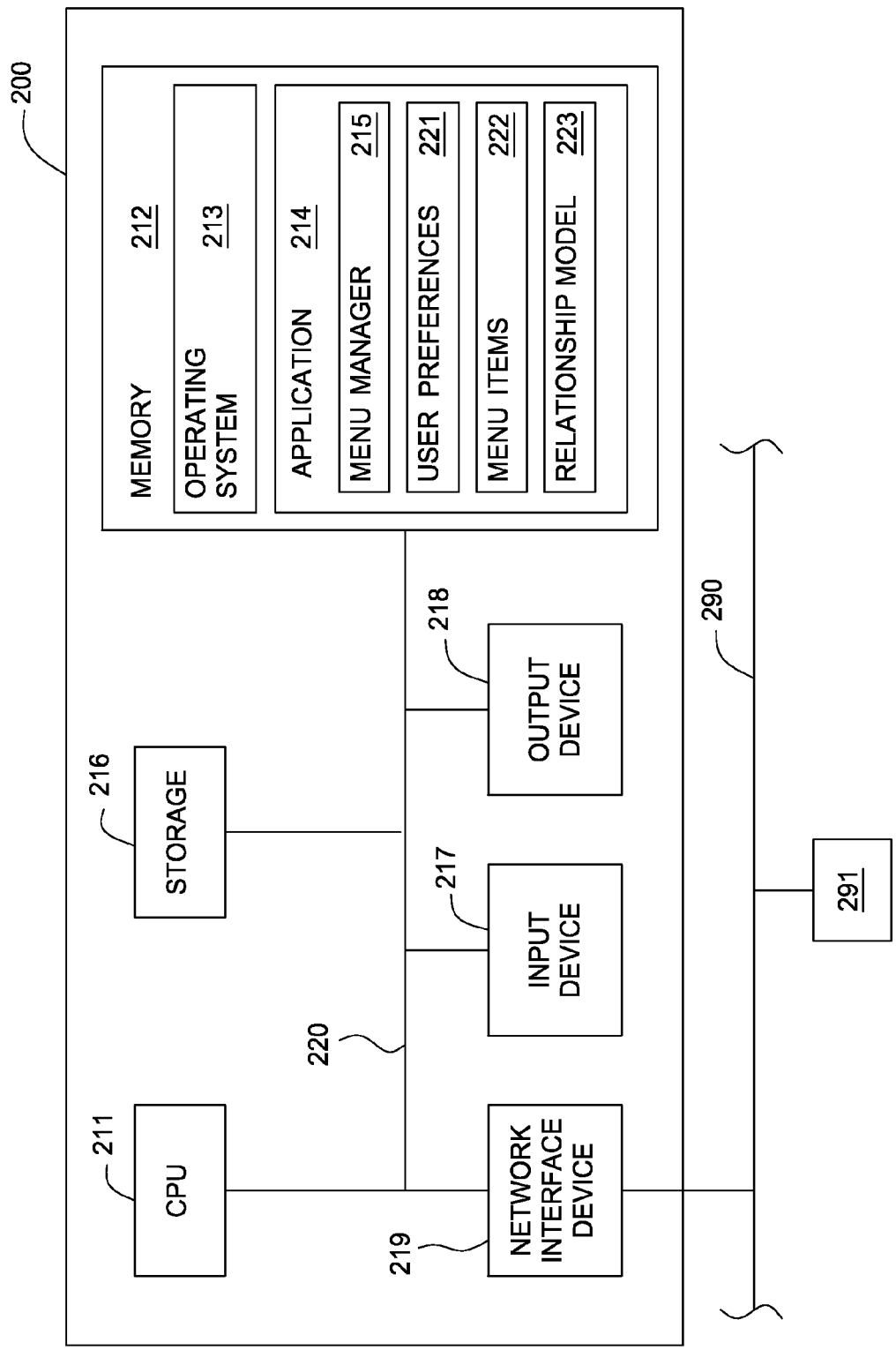
FIG. 2 illustrates an exemplary system according to an embodiment of the invention.

FIG. 2 depicts a block diagram of a system 200 in which embodiments of the invention may be implemented. The system 200 may include a Central Processing Unit (CPU) 211 connected via a bus 220 to a memory 212, storage 216, an input device 217, an output device 218, and a network interface device 219. The input device 217 can be any device to give input to the system 200. For example, a keyboard, keypad, light-pen, touch-screen, track-ball, or speech recognition unit, audio/video player, and the like could be used. The output device 218 can be any device to give output to the user, e.g., any conventional display screen. Although shown separately from the input device 217, the output device 218 and input device 217 could be combined. For example, a display screen with an integrated touch-screen, a display with an integrated keyboard, or a speech recognition unit combined with a text speech converter could be used.

The network interface device 219 may be any entry/exit device configured to allow network communications between the system 200 and one or more other devices 291 via a network 290. For example, the network interface device 119 may be a network adapter or other network interface card (NIC).

Storage 216 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 212 and storage 216 could be part of one virtual address space spanning multiple primary and secondary storage devices.

The memory 212 is preferably a random access memory sufficiently large to hold the necessary programming and data structures of the invention. While memory 212 is shown as a single entity, it should be understood that memory 212 may in fact comprise a plurality of modules, and that memory 212 may exist at multiple levels, from high speed registers and caches to lower speed but larger DRAM chips.

Illustratively, the memory 212 contains an operating system 213. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 212 may also include one or more applications 214. The applications 214 may be software products comprising a plurality of instructions that are resident at various times in memory and storage devices in the computer system 200. When read and executed by one or more CPU 211, the applications 214 may cause the computer system 200 to perform the steps necessary to execute steps or elements embodying the various aspects of the invention.

In one embodiment, the applications 214 may include a menu manager program 215, user preferences 221, menu items 222, and a relationship model 223. Menu manager 215 may be configured to display a radial menu on the output device 218, and detect selection of one or more radial menu items, as is discussed in greater detail below. In some embodiments the application program 214 and menu manager 215 may reside on a networked computer device 291 and may be configured to manage radial menus on the output device 118 of computer system 200.

The user preferences 221 may define one or more characteristics of radial menus, for example, the size and shape of radial menus, methods for displaying radial menus, making selections from radial menus, and the like, as will be discussed in greater detail below. Menu items 222 may include a list of items that may be displayed on a radial menu. Each of the menu items 222 may be associated with one or more functions of the application 215. The relationships model 223 may define relations between the menu items 222. In one embodiment, the relationships model 223 may define groups of related menu items, and relationships between various groups of menu items. In one embodiment, the relationships between the menu items 222 (and groups of menu items), as defined in the relationships model 223, may determine the placements of menu items in a radial menu displayed by the menu manager 215. The placement of menu items in a radial menu is discussed in greater detail below.

Exemplary Radial Menus

Figure 3:
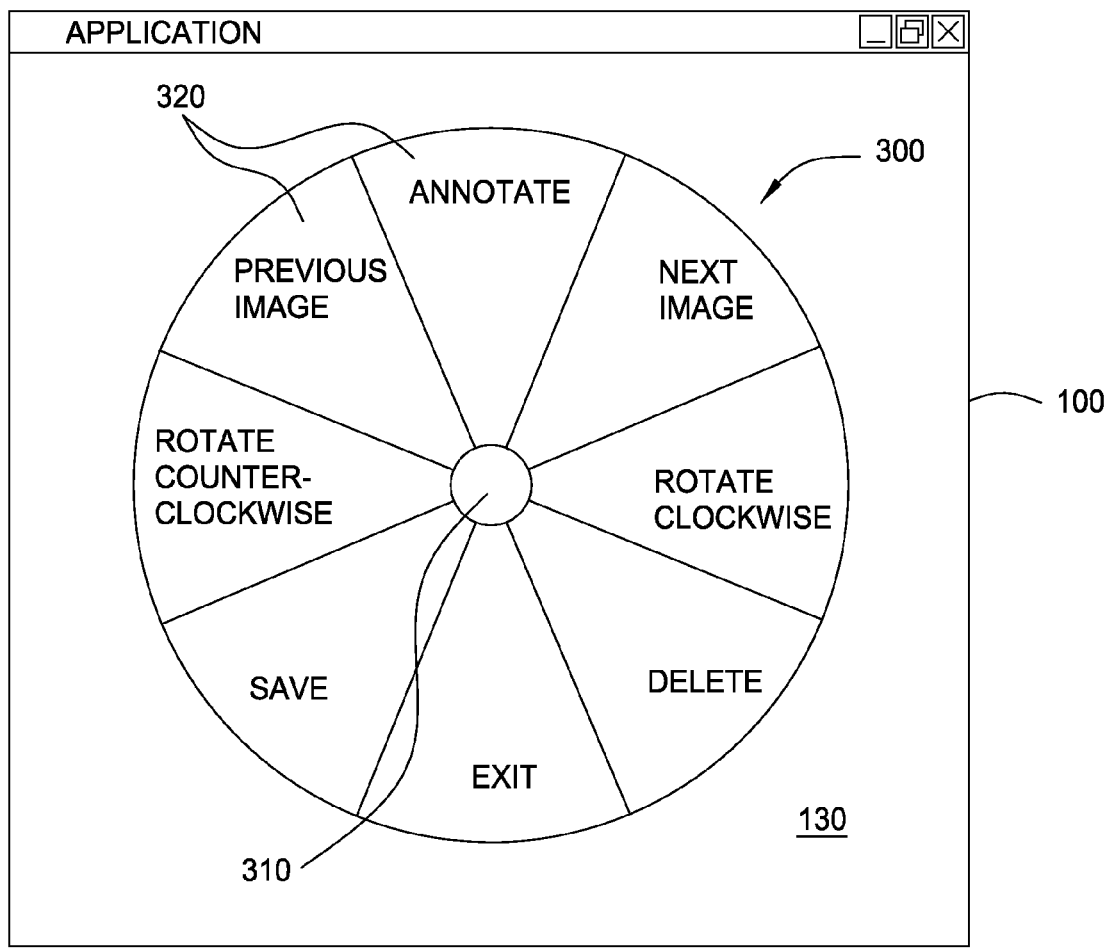
FIG. 3 illustrates an exemplary radial menu according to an embodiment of the invention.

FIG. 3 illustrates an exemplary radial menu 300, according to an embodiment of the invention. In one embodiment, the radial menu 300 may be displayed in an application window 100 by the menu manager 115, as illustrated in FIG. 3. However, in alternative embodiments, the menu manager 115 may be configured to display the radial menu 300 at any location on a screen, whether inside or outside a window.

In general, the radial menu 300 may include a center 310 and a plurality of radial menu items 320 placed radially outwards from the center 310. For purposes of illustration, the radial menu 300 is assumed to be associated with an image editing software. Accordingly, the radial menu items 320 displayed in FIG. 3 include "Previous Image", "Next Image", "Annotate", "Rotate Clockwise", "Rotate Counterclockwise", "Save", "Exit", and "Delete". In a particular embodiment, the radial menu 300 may include between 6 and 8 radial menu items, however, any reasonable number of radial menu items may be included in the radial menu 300 in other embodiments.

The radial menu items 320 may be selected by using a screen pointer such as, for example, a mouse pointer, a stylus pen, trackball pointer, and the like, as is described in greater detail below. Each of the radial menu items 320 may be associated with commands and/or functions that may be used to communicate with an application 114 associated with the radial menu 300. For example, the "Next Image" radial menu item, when selected, may cause a new image to be displayed in an application content area 130 of window 100 in FIG. 3. As another example, the "Annotate" radial menu item, when selected, may launch a function that may allow a user to insert annotations for an image displayed in the application content area 130. In some embodiments, selecting a radial menu item may result in a second or cascaded radial menu to be displayed.

Figure 4A:
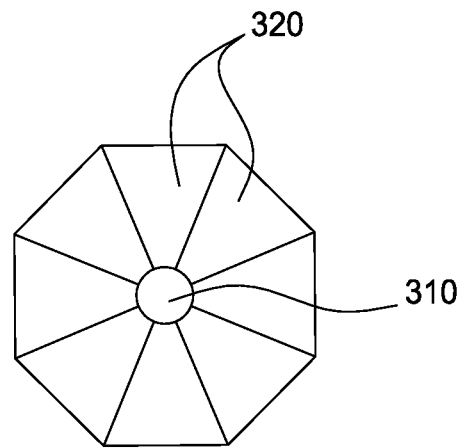
FIGS. 4A-4C illustrate further exemplary radial menus according to embodiments of the invention.
Figure 4B:
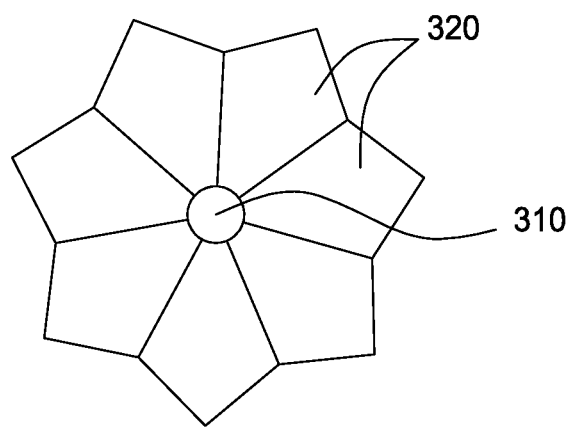
Figure 4C:
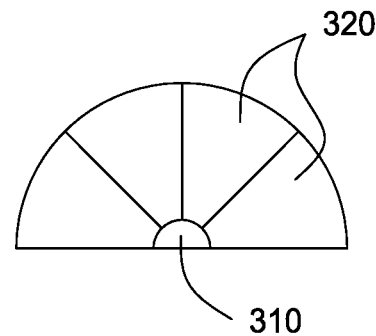

In one embodiment of the invention, the radial menu items 320 may be displayed as a "pie slices" 320, as illustrated in FIG. 3. However, in alternative embodiments, the radial menu items may have any reasonable shape that allows a plurality of radial menu items 320 to be displayed radially outwards from the center 310. FIGS. 4A and 4B, illustrate some alternative shapes for the radial menu items 320. Furthermore, while a circular radial menu 300 is illustrated in FIG. 3, in alternative embodiments, the radial menu 300 may be semicircular, quadra circular, or any other radial shape. For example, FIG. 4C illustrates a semicircular radial menu, according to an embodiment of the invention.

The radial menu 300 may be a pop-up menu that is displayed upon the occurrence of a predefined screen pointer event. For example, in one embodiment, the menu manager 115 may be configured to display the radial menu 300 on a screen (for example, in window 100) upon detecting a mouse click. In a particular embodiment, the radial menu 300 may be displayed when a right button of a mouse is clicked. While using mouse clicks to display radial menus is described herein, alternative screen pointer events that may cause a radial menu to appear may include, for example, touching a screen with a stylus pen or finger, pressing one or more keys on a keyboard, receiving a voice command, and the like.

Figure 5:
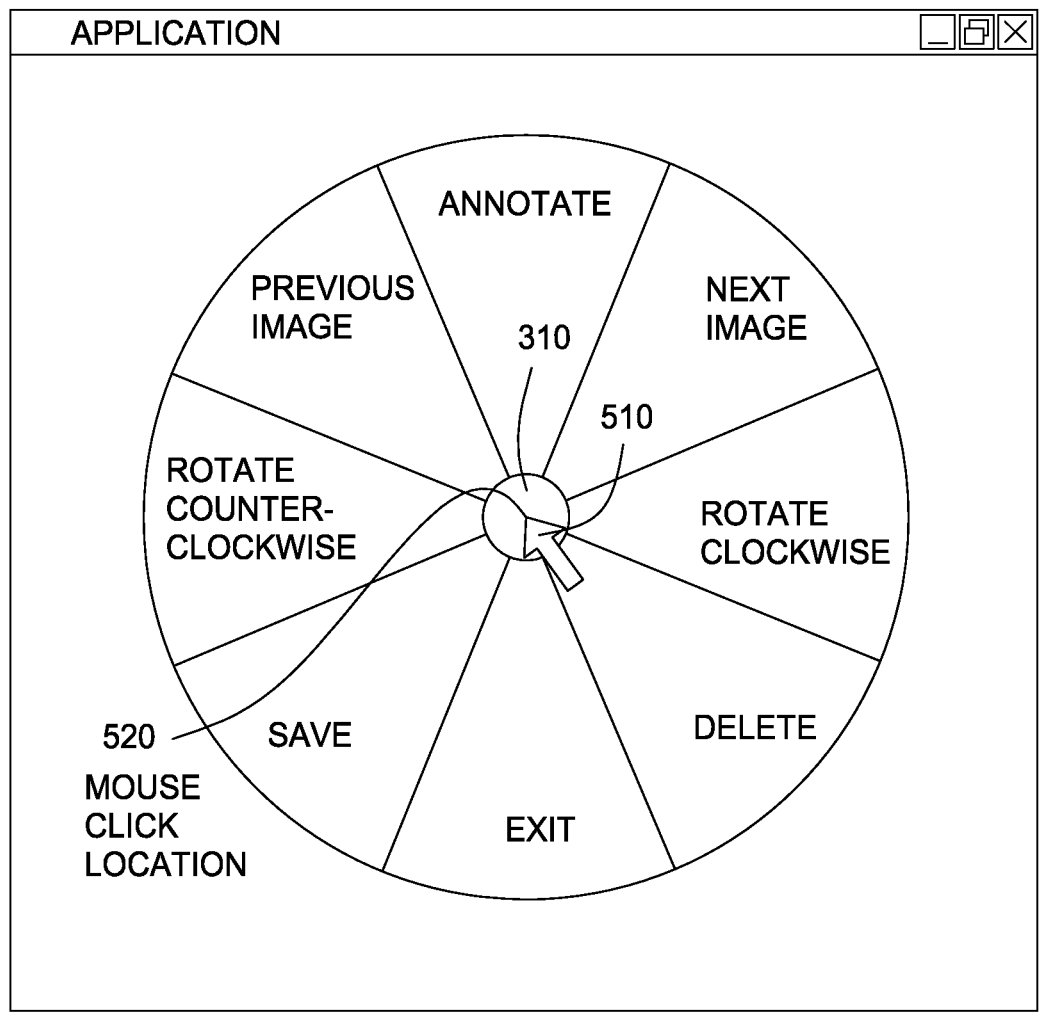
FIG. 5 illustrates an exemplary screen pointer event for displaying a radial menu, according to an embodiment of the invention.

In one embodiment of the invention, the menu manager 115 may display the radial menu such that the center of the radial menu aligns with the screen pointer. FIG. 5 illustrates a radial menu 300 displayed such that the center 310 of the radial menu 300 aligns with a location 520 of a screen pointer 510. As illustrated in FIG. 5, the screen pointer may be a mouse pointer and the location 520 may be a location of the mouse pointer when the mouse is clicked. Alternatively the location 520 may be the location where a stylus pen or finger touches a display screen.

Selection of a radial menu item from a radial menu may involve moving the screen pointer 510 in the direction of a desired radial menu item 320. For example, to select the "Annotate" radial menu item, the screen pointer may be moved straight up (in a generally 90 degrees direction) towards the pie slice of the "Annotate" radial menu item. The moving of the screen pointer on the display screen is generally referred to hereinafter as a "stroke". In the case of a mouse pointer, strokes may be performed by simply moving the mouse on a mouse pad. While using a stylus pen or finger on a touch screen, the finger or stylus pen may simply be dragged across the screen to perform a stroke.

Placing the screen pointer over a radial menu item 320 may cause the radial menu item to become active. When a radial menu item 320 is active, the occurrence of a selection event, such as, for example, a mouse click, may cause the radial menu item 320 to be selected. In one embodiment of the invention, the menu manager 115 may be configured to provide a visual indication to identify an active radial menu item.

Figure 6:
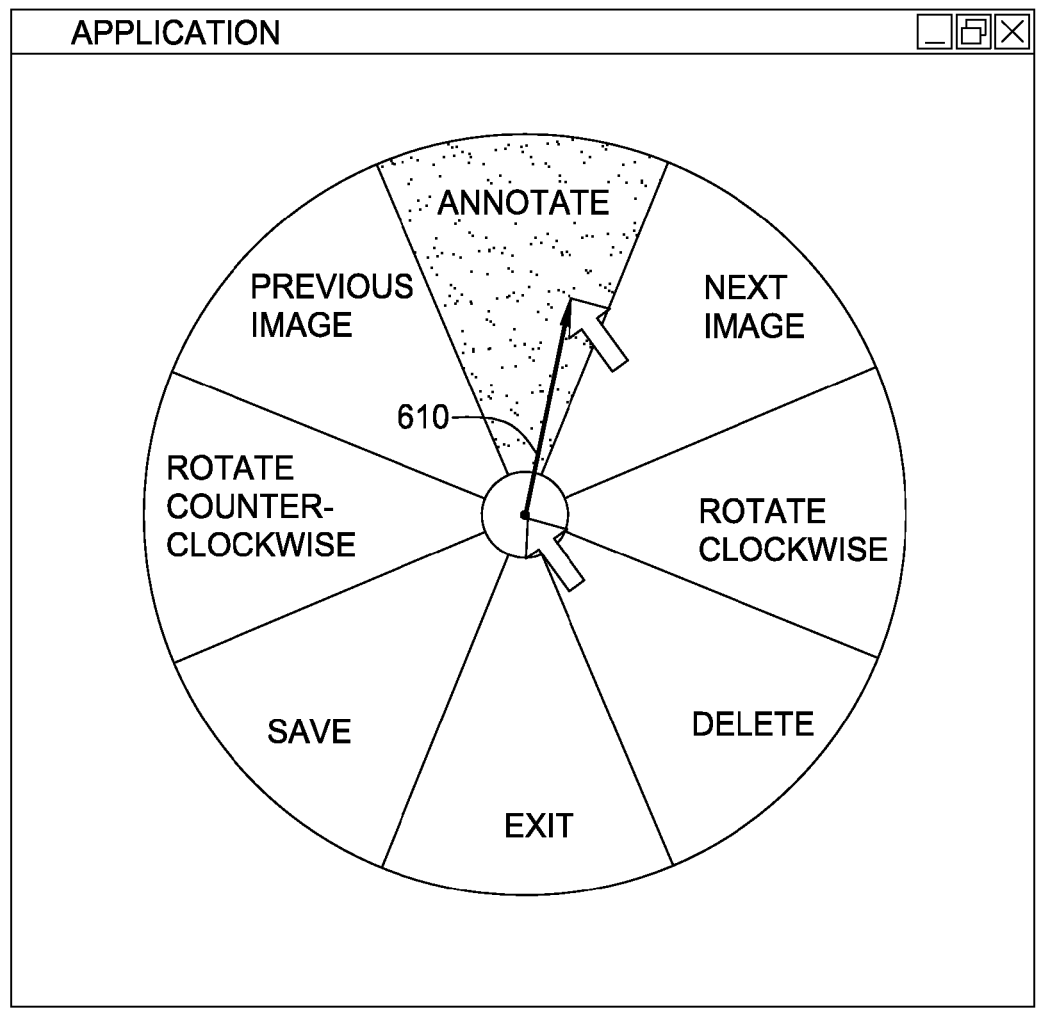
FIG. 6 illustrates an exemplary stroke according to an embodiment of the invention.

FIG. 6 illustrates an exemplary stroke 610 which results in the activation of a radial menu item, according to an embodiment of the invention. As illustrated in FIG. 6, the stroke 610 moves the screen pointer over the "Annotate" radial menu item. As a result, the menu manager 115 may change the background color of the "Annotate" pie slice, which is indicated by the shading of the "Annotate" pie slice in FIG. 6. The change in color may identify the "Annotate" radial menu item as the active item. Other methods for providing a visual indication such as, for example, bold facing the letters of the active radial menu item, dimming or fading the pie slices or letters of non-active radial menu items, and the like, are also contemplated. While a straight line stroke is illustrated in FIG. 6, the stroke 610 may include any movement in any and/or multiple directions on a display screen in alternative embodiments.

In one embodiment, the center 310 of the radial menu 300 may be an inactive center. In other words, no radial menu items 320 may be active while the screen pointer 510 lies over the center portion 310. Therefore, when the menu manager 115 aligns the center 310 of the radial menu when the radial menu is displayed as described above, no radial menu items 320 may be initially active. Thereafter, user strokes may cause one or more radial menu items to become active. If the user strokes return the screen pointer to the center 310, all radial menu items may again become inactive.

One embodiment of the invention may allow radial menu items 320 to be selected in a single gesture. In general, a gesture may include at least one or more strokes. Additionally, in some embodiments, a gesture may include one or more screen pointer events such as, for example, mouse click downs (pressing a mouse button), mouse click offs (releasing the mouse button), touching a screen with a stylus pen or finger, removing stylus pen or finger from the screen and the like. The menu manager 115 may be configured to analyze gestures performed on a display screen to determine whether a radial menu item is selected. In one embodiment, a plurality of predefined gestures may correspond to respective menu item selections.

For example, an exemplary gesture for selecting a radial menu item may include performing a first mouse click, i.e., a mouse button click down and release. The first mouse click may display a radial menu, for example, the radial menu 300 on the display screen. Thereafter, one or more strokes may be performed to move the mouse pointer over a desired radial menu item 320. As discussed above, menu manager 115 may provide a visual indication that the desired radial menu item is active. When the mouse pointer is over the desired radial menu item, the mouse may be clicked a second time. Because the second mouse click occurred while the mouse pointer is above a radial menu item 320, the menu manager may determine that a radial menu item selection has occurred. Therefore, the menu manager 115 may cause a command or function associated with the selected radial menu item to be executed. In this example, the combined events of the first mouse click, the subsequent one or more strokes, and the second mouse click define the exemplary gesture.

Figure 7A:
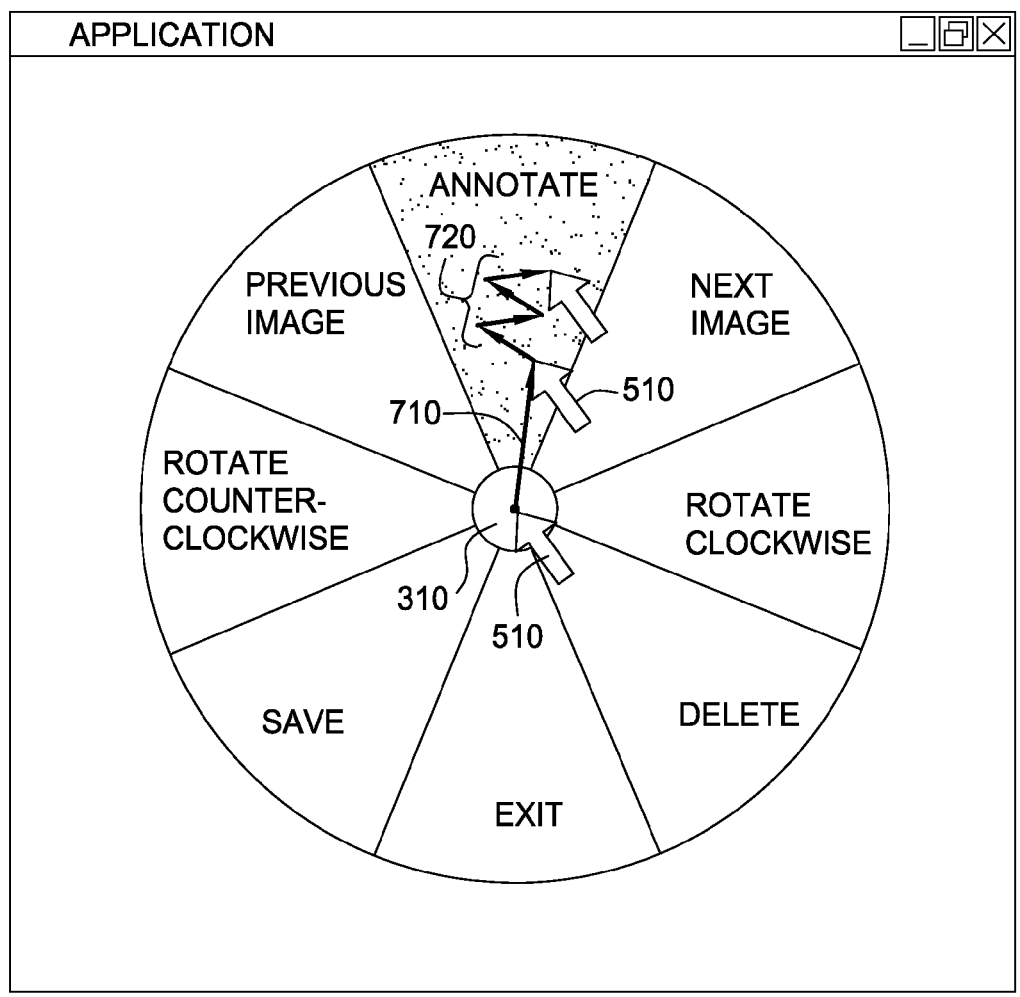
FIGS. 7A-7C illustrate exemplary strokes for selecting a radial menu item, according to an embodiment of the invention.

In one embodiment of the invention, a gesture for selecting a radial menu item may include a first mouse click (i.e., a mouse click down and release) that causes a radial menu to be displayed on the display screen, a first stroke configured to activate a radial menu item, and a predefined second stroke that is configured to select the radial menu item. FIG. 7A illustrates exemplary first and second strokes according to an embodiment of the invention. As illustrated in FIG. 7A, a first stroke 710 may move the screen pointer 510 from a center 310 of the radial menu to the "Annotate" radial menu item. Thereafter, a predefined second stroke may be performed to select the "Annotate" radial menu item. As illustrated in FIG. 7A, predefined second stroke may involve moving the screen pointer in a zigzag back and forth motion over a same path. If the predefined back and forth motion is detected by the menu manager while the screen pointer is over a radial menu item, the radial menu item may be selected.

Figure 7B:
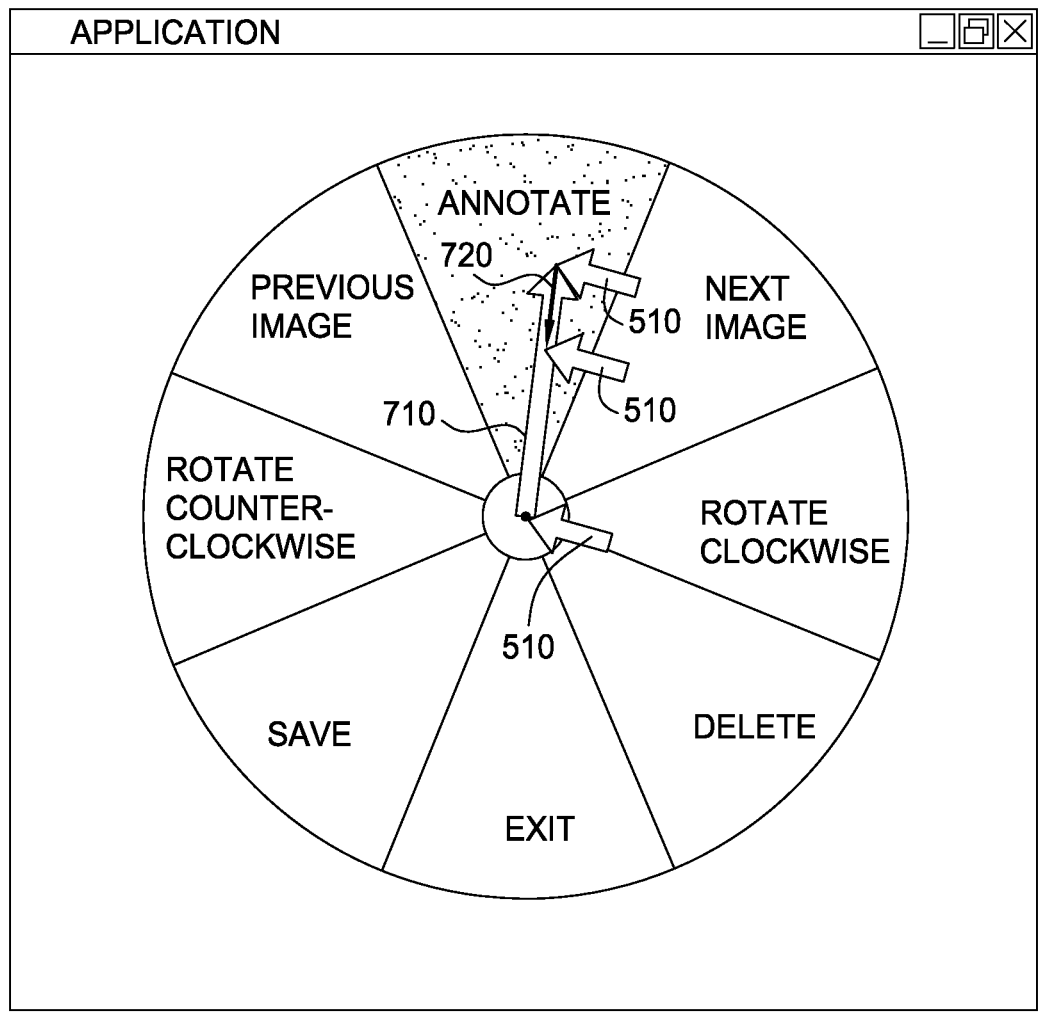

Any reasonable predefined movement of the screen pointer 510 may be used as a radial menu selection event. FIG. 7B illustrates an alternative predefined second motion that may result in the selection of a radial menu item. As illustrated in FIG. 7B, a first stroke may move the screen pointer 510 from a center 310 of the radial menu to the "Annotate" radial menu item. A predefined second stroke may move the screen pointer back in a direction towards the center 310, which may result in the selection of the "Annotate" radial menu item. Still another alternative predefined second strokes may include substantially circular and/or semi-circular movement of the screen pointer over the radial menu item.

In another embodiment, the gesture for selecting a radial menu item may involve a mouse button click down (without release), a first stroke for activating a radial menu item, and a second predefined stroke for selecting the radial menu item. The mouse button may be released after selection of the radial menu item. The mouse button click down may cause a radial menu to be displayed. The first stroke and predefined second stroke may function as described above.

In some embodiments, if a second predefined stroke is not received within a predefined period of time after activation of the radial menu, the menu manager 115 may be configured to close the radial menu. Closing the radial menu may involve removing the radial menu from the display screen. In some embodiments, the predefined period of time may begin after completion of the first stroke. For example, a screen pointer event may cause the radial menu to be displayed. Thereafter, a first stroke may be completed to activate a radial menu item. If the predefined second stroke is not received within the predefined period of time after completion of the first stroke, the radial menu may be closed by the menu manager 115.

In yet another embodiment, the menu manager 115 may select an active radial menu item if the radial menu item has been active for a predefined period of time. Accordingly, the gesture for selecting a radial menu item may involve a mouse button click down (with or without release), and a first gesture for activating a radial menu item. The mouse button click down may cause a radial menu to be displayed. The first stroke may function as described above to activate a radial menu item. The menu manager 115 may monitor the time for which a particular radial menu item has been active, and select the radial menu item after the predefined period of time.

While the first stroke is illustrated as a straight line from the center 310 of the radial menu to a desired radial menu element 320, in some embodiments, the first stroke may include movement along any part of the display screen. For example, a user may initially move the screen pointer in the direction of a first radial menu item, but then decide to choose a second radial menu item instead. Accordingly, the user may move the screen pointer across the screen until the desired second radial menu item is activated. Once the second radial menu item is activated, the user may perform the predefined second stroke to select the second radial menu item.

Figure 7C:
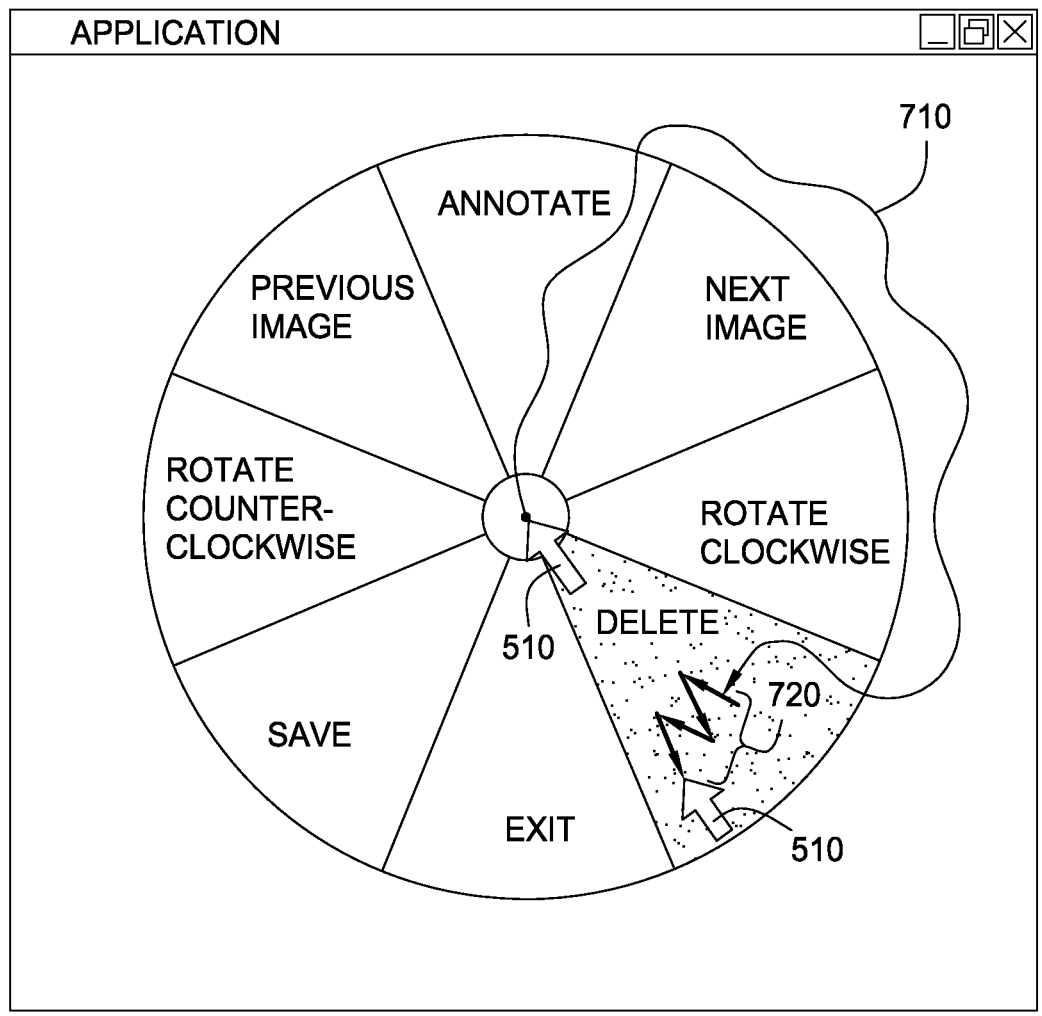

FIG. 7C illustrates exemplary first and second strokes according to another embodiment of the invention. As illustrated in FIG. 7C, the first stroke 710 may include an initial movement towards a first radial menu item ("Annotate"). The first stroke 710 may continue to move across the screen until a second radial menu item ("Delete") is activated, as indicated by the shading. Thereafter, a predefined second stroke 720 may be performed to select the second radial menu item. In some embodiments, the first stroke may include movement over multiple radial menu items until a desired radial menu item is activated.

In one embodiment of the invention, a gesture for selecting a radial menu item may include a first mouse click (i.e., a mouse click down and release) that causes a radial menu to be displayed on the display screen, and a first stroke configured to activate and select the radial menu item. The first stroke may activate a menu item 320 when the mouse pointer is moved thereon. Furthermore, the menu manager 115 may be configured to analyze a speed of the screen pointer during the first stroke. If the speed exceeds (or falls below) a predefined threshold value, the activated radial menu item may be selected. The threshold speed values may be user configurable in some embodiments. For example, the threshold speed values may be defined by a user in the user preferences 221 (See FIG. 2).

Figure 7D:
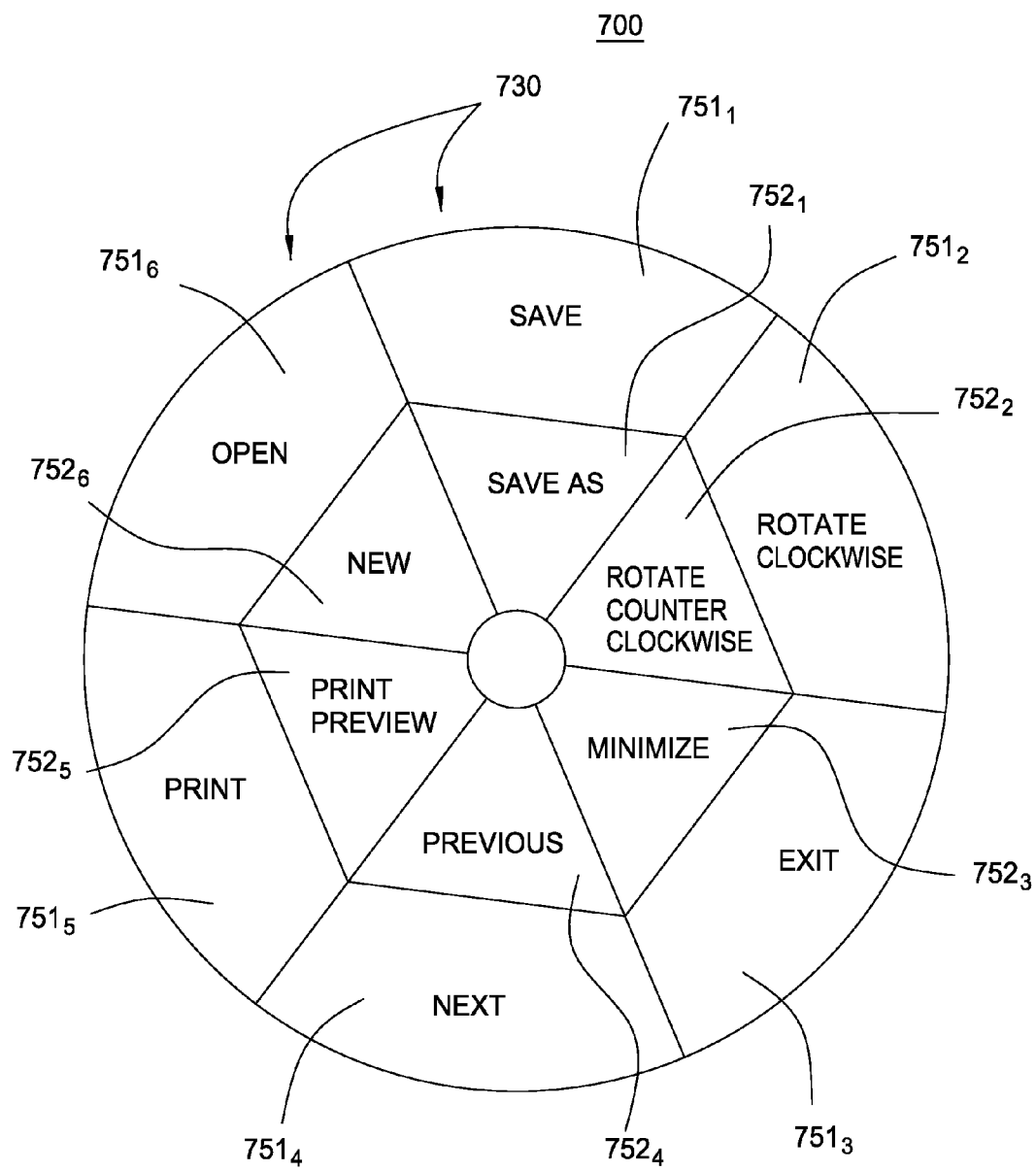
FIG. 7D illustrates an overloaded radial menu according to an embodiment of the invention.

In one embodiment of the invention, each pie slice of the radial menu may be overloaded with two or more radial menu items. FIG. 7D illustrates an exemplary radial menu 700 comprising a plurality of pie slices 730. As illustrated in FIG. 7D, each pie slice 730 may include a first radial menu item 751 and a second radial menu item 752. In one embodiment of the invention, a gesture for selecting a first radial menu item 751 may include a first mouse click (i.e., a mouse click down with or without release) that causes a radial menu to be displayed on the display screen, a first stroke configured to activate the first radial menu item 751, and a corresponding second radial menu item 752, and a predefined second stroke configured to select the first radial menu item 751. An exemplary predefined second stroke may include a stroke in a clockwise direction. A gesture for selecting a second radial menu item 751 may include a first mouse click (i.e., a mouse click down with or without release) that causes a radial menu to be displayed on the display screen, a first stroke configured to activate the second radial menu item 752 and a corresponding first radial menu item 751, and a predefined third stroke configured to select the second radial menu item 751. An exemplary predefined third stroke may include a stroke in the counter-clockwise direction.

Figure 7E:
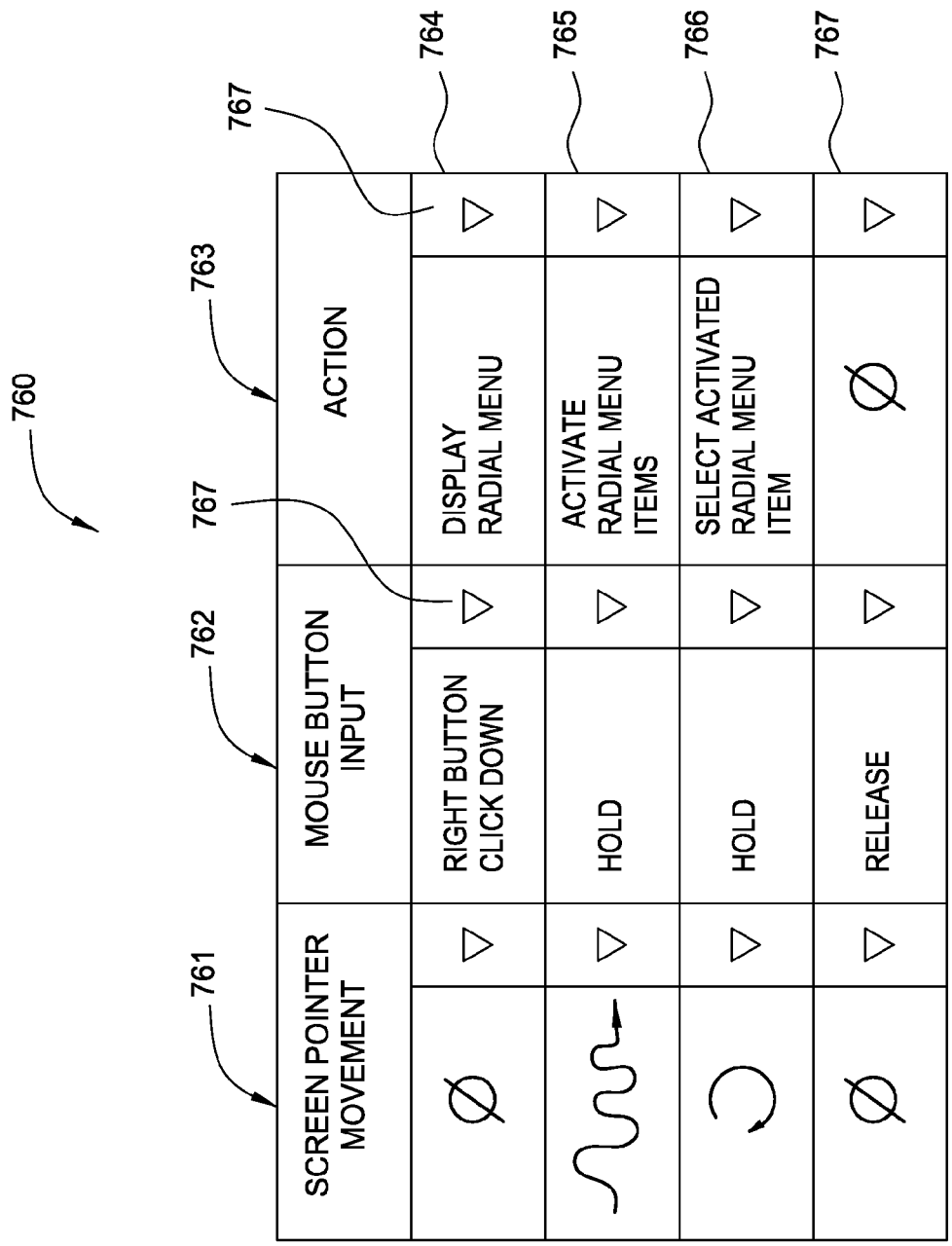
FIG. 7E illustrates an exemplary graphical user interface for defining gestures, according to an embodiment of the invention.

In one embodiment of the invention, a user may be allowed to define the particular gesture for selecting items from a radial menu. For example, in one embodiment, the application 114 may be configured to display a graphical user interface that allows a user to define a gesture for selecting radial menu items. The user defined gesture may be stored in the user preferences 221, in one embodiment. FIG. 7E illustrates an exemplary graphical user interface for defining a gesture for selecting radial menu items. As illustrated in FIG. 7E, the user preferences 221 may include a first column for defining screen pointer movement (or strokes), a second column 762 for defining mouse button input, and a third column 763 for defining an action performed based on the defined inputs in columns 761 and 762.

As illustrated in FIG. 7E, the GUI 760 may include a plurality of drop down menus 767 for defining the particular inputs and the actions performed in response to the inputs. Alternatively, the GUI may include radio buttons, text boxes, check boxes, and the like for defining the inputs and actions. In some embodiments, the GUI 760 may include a screen where the input (for example, strokes and mouse clicks) may be performed to define the inputs and/or actions.

The first row 764 defines an exemplary screen pointer event, i.e, right mouse button click down, that results in a radial menu being displayed. Alternatively, a right mouse button click down and click off may also be selected as a predefined screen pointer event for displaying a radial menu. As can be seen in row 764 of FIG. 7E, the no screen pointer movement has been defined. In alternative embodiments, the user may define a screen pointer movement for displaying the radial menu instead of (or in addition to) the right button mouse click down.

Row 765 illustrates inputs for activating radial menu items. As illustrated, f radial menu items may be activated when the right mouse button is held down and the screen pointer is moved in any direction as illustrated by the symbol in row 765, column 761. Alternatively, a user may choose to select a straight line movement of the screen pointer for selecting radial menu items. Row 766 illustrates a predefined second stroke, i.e., a circular stroke, for selecting a radial menu item. Row 767 illustrates a mouse button click off. While no action is shown for the mouse button click off on FIG. 7E, in some embodiments, the mouse button click off may result in predefined action, for example, selection of the radial menu item, removing of the radial menu from the display screen, or the like.

Figure 8:
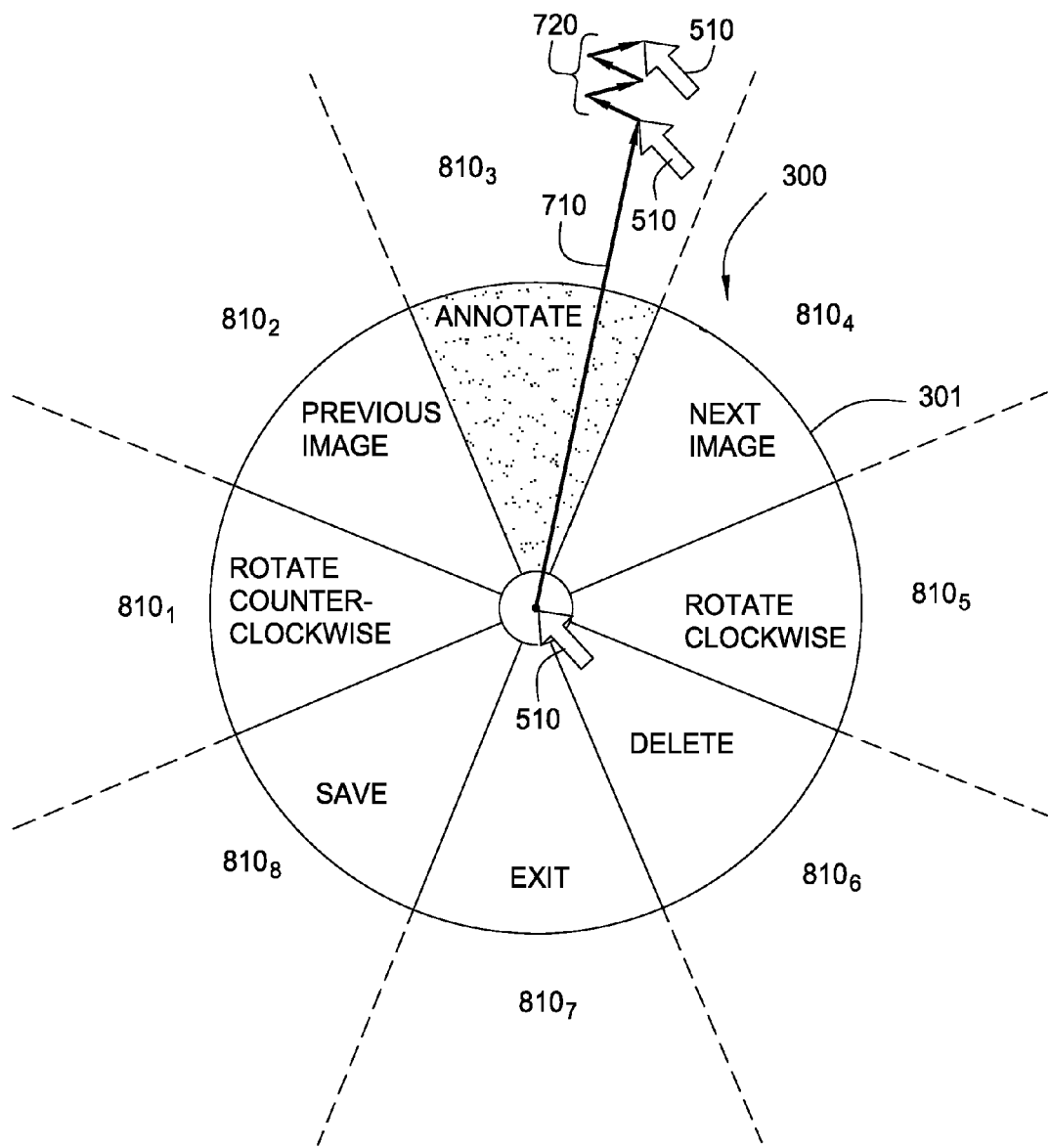
FIG. 8 illustrates an exemplary selection zone according to an embodiment of the invention.

In one embodiment of the invention, it may be possible to select radial menu items even though a selection event occurs outside the bounds of the radial menu. FIG. 8 illustrates an exemplary radial menu 300 comprising a plurality of extra-territorial zones 810$_{1-8}$ associated with respective radial menu items 320. As shown in FIG. 8, the zones 810$_{1-8}$ may be outside the visible bounds of the radial menu 300. As shown in FIG. 8, the outside bounds of the radial menu 300 are demarcated by a circle 301. The circle 301 is merely illustrative. In other embodiments, any visible geometric shape 301 is contemplated. In one embodiment of the invention, if a screen pointer is in a zone 810, the radial menu item 320 associated with the zone 810 may be active. Accordingly, if a selection event occurs in the zone 810, a selection of the radial menu item associated with the zone 810 may occur. In other words, a pie slice of the radial menu item 320 and a respective zone 810 may define a selection zone of a radial menu item within which gestures may be performed for selection of the radial menu item.

For example, FIG. 8 illustrates a first stroke 810 which moves the screen pointer 510 across the "Annotate" radial menu item pie slice and into the zone 810$_3$ associated with the "Annotate" radial menu item. As can be seen in FIG. 8, the "Annotate" radial menu item remains active even though the screen pointer is outside the bounds of the radial menu 300. Further as depicted in FIG. 8, a predefined second stroke 720 may occur in the zone 810$_3$ associated with the "Annotate" radial menu item. The menu manager 115 may detect the predefined second stroke in the zone 810$_3$ and cause the respective "Annotate" radial menu item to be selected.

Allowing users to make elongated first strokes such as, for example, the elongated first stroke 710 in FIG. 8 may reduce errors in selection of radial menu items. As can be seen in FIG. 8, the further the screen pointer is moved from the center 310 of the radial menu, the greater the area that is available for making gestures such as, for example, the predefined second gestures. By providing greater area for gestures, the probability of gesture strokes accidentally moving into zones 810 of undesired radial menu items may be reduced.

Furthermore, activating radial menu items as a user performs a first stroke that is outside the bounds of the radial menu item may allow greater precision in the activation of a desired radial menu item. For example, the further the screen pointer 510 is from the center 310, the greater the radial distance that must be traveled by the screen pointer 510 to a zone 810 of an adjacent radial menu item. One skilled in the art will appreciate that allowing a user to move the screen pointer in a wider arcs around the radial menu allows increased precision in activating desired radial menu items.

Figure 9:
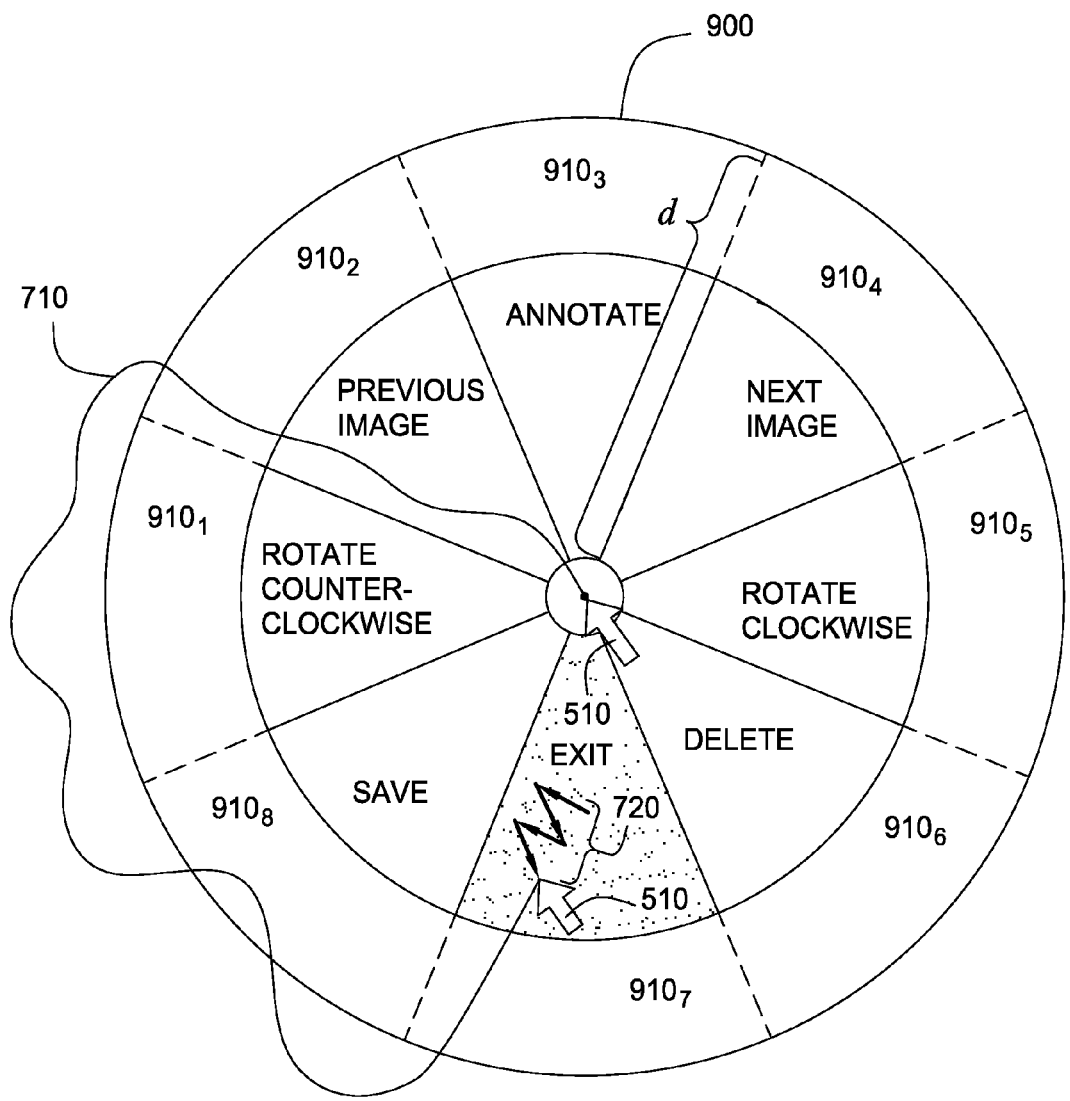
FIG. 9 illustrates another exemplary selection zone according to an embodiment of the invention.

As illustrated in Figure, in some embodiments the zones 810 may extend to the edges of a display area, for example, to the edges of a display screen, an application window, or the like. In an alternative embodiment, a predefined limited selection zone may be defined outside the bounds of the radial menu for receiving selections of radial menu items. FIG. 9 illustrates a circular perimeter 900 around the radial menu 300 that defines a plurality of zones 910$_{1-8}$ for each of the radial menu items 320. In one embodiment, the perimeter may be made visible to the user, for example, by displaying a solid line, dashed line, shading the zones 910, or the like. The perimeter 900 may have a predefined distance d from the center 310 of the radial menu 300. For example, the perimeter d may be defined by a user in the user preferences 221 illustrated in FIG. 2. While a circular perimeter is shown herein, in alternative embodiments the perimeter 900 may have any reasonable shape that encompasses the radial menu 300. The dimensions of the perimeter may be user configurable in some embodiments.

In one embodiment of the invention, a predefined second stroke as described above, if performed within a zone 910, may result in the selection of a respective radial menu item 320. If a screen pointer is moved outside the perimeter 900, all radial menu items 320 may become inactive. Therefore, if the predefined second strike is performed outside the perimeter 900, a radial menu item 320 may not be selected.

In one embodiment of the invention, selecting a radial menu item 320 may involve performing the first stroke followed by a predefined second stroke as described above. The first stroke may include moving the screen pointer in and out of the perimeter 900. An exemplary first stroke 710 is illustrated in FIG. 9. As illustrated, the first stroke 710 may begin with a movement of the mouse pointer towards a first radial menu item ("Previous Image"). As the screen pointer is moved across the pie slice representing the first radial menu item and the zone 910 associated therewith, the menu manager 115 may activate the first radial menu item. However, when the screen pointer moves outside the perimeter 900, the first radial menu item may be deactivated by the menu manager 115.

As illustrated further in FIG. 9, the first stroke may continue to move the screen pointer outside the perimeter 900 and reenter the perimeter 900 in a zone 910 associated with a second radial menu item ("Rotate Counterclockwise"). When the screen pointer enters the zone 910 associated with the second radial menu item, the menu manager 115 may activate the second menu item. However, when the screen pointer moves outside the perimeter 900 again, the second radial menu item may be deactivated by the menu manager 115.

The screen pointer may be moved in and out of the perimeter 900 several times as described above, which may result in the activation and deactivation of several radial menu items. FIG. 9, depicts the first stroke terminating in a selection zone of a third radial menu item ("Exit"), thereby activating the third radial menu item as illustrated. A predefined second stroke 720 associated with the activated menu item is also shown, which may result in the selection of the third radial menu item.

In one embodiment of the invention, moving the screen pointer outside the perimeter 900 may result in the radial menu 300 being removed from the display screen. This may allow a user to cancel or remove the radial menu from the screen in a fluid gesture without additional actions. For example, if a user causes a radial menu to be displayed on the screen (by clicking a mouse button for example), and decides that he no longer wants to make a selection from the radial menu, the user may simply make an elongated straight line first stroke that would take the screen pointer outside the predefined perimeter 900. Upon detecting that the screen pointer is outside the perimeter 900, the menu manager 115 may remove the radial menu from the display screen.

Figure 10:
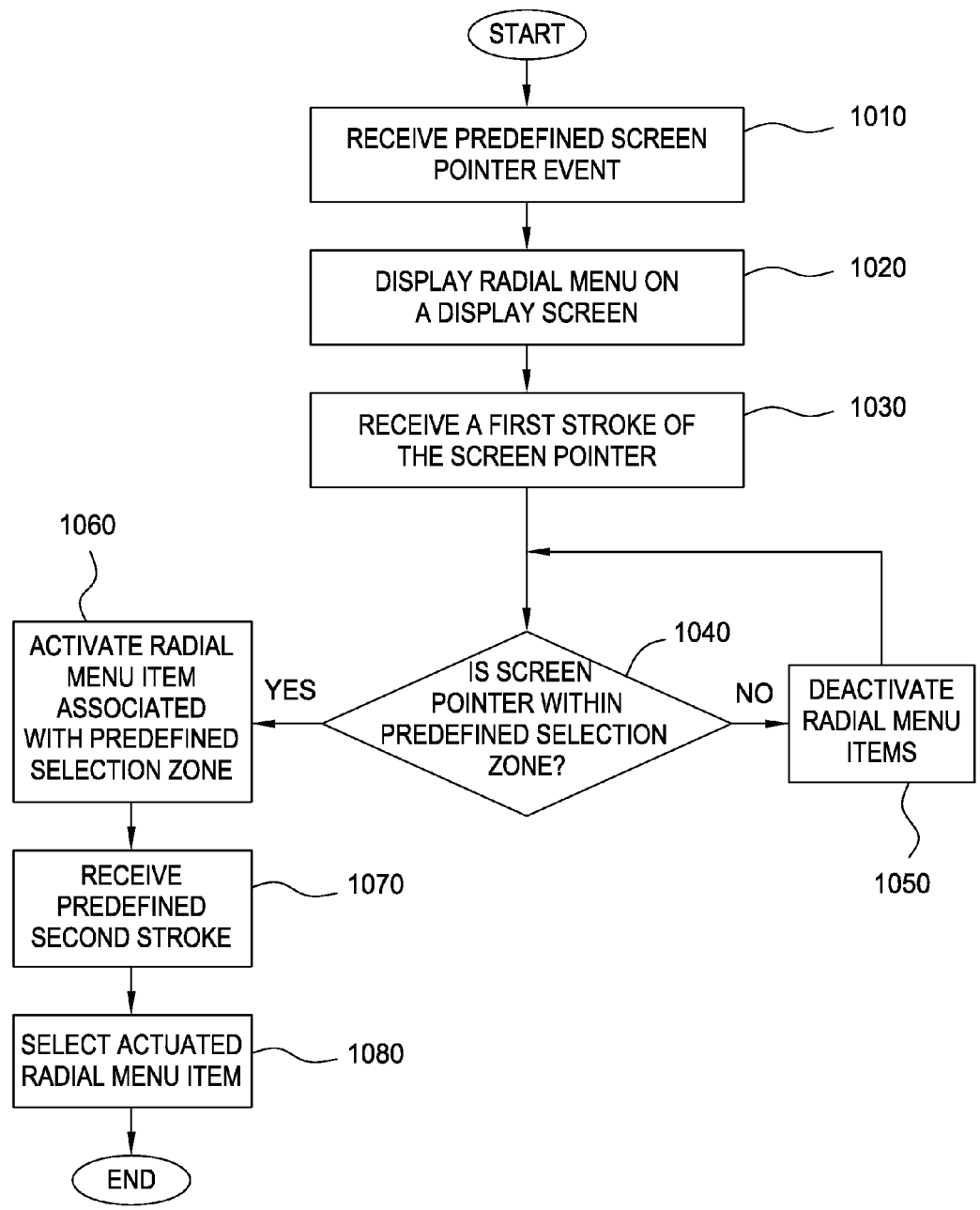
FIG. 10 is a flow diagram of exemplary operations performed by a menu manager, according to an embodiment of the invention.

FIG. 10 is a flow diagram of exemplary operations that may be performed by a menu manager 115, according to an embodiment of the invention. The operations may begin in step 1010 by receiving a predefined screen pointer event. Exemplary predefined screen pointer events may include, for example, a mouse click down, touching of a touch screen with a stylus pen or finger, and the like. In response to receiving the predefined screen pointer event the menu manager 115 may display a radial menu on a display screen, in step 1020.

In step 1030, the menu manager 115 may receive a first stroke of the screen pointer. As described above, the first stroke may include a movement of the screen pointer in any direction and/or multiple directions on the display screen. As the screen pointer moves across the screen during the first stroke, the menu manager may determine whether the screen pointer is within a predefined selection zone of one or more radial menu items of the radial menu in step 1040. The predefined selection zone may include the pie slices 320 as illustrated in FIG. 3. In some embodiments, the predefined selection zone may also include the zones 910, as described with reference to FIG. 9.

If the screen pointer is determined to be outside the predefined selection zone, all radial menu items may be deactivated in step 1050. On the other hand, if the screen pointer is within a predefined selection, zone a radial menu item associated with the predefined selection zone may be activated for selection in step 1060. In one embodiment, activating a radial menu item for selection may involve providing a visual indication that the radial menu item is active.

In step 1070, the menu manager 115 may receive a predefined second stroke, for example, the predefined second strokes 720 described with reference to FIGS. 7A and 7B. In response to receiving the predefined second stroke, the menu manager 115 may select a respective active radial menu item in step 1080. In one embodiment, selecting the radial menu item may involve launching execution of a command or function associated with the selected radial menu item.

In one embodiment of the invention, after selection of a radial menu item, the menu manager 115 may remove the radial menu from the display screen. In a particular embodiment, after selection of a particular radial menu item, the radial menu may be removed from the display screen after a predefined period of time. In some embodiments, the radial menu may fade away during the predefined period of time.

During the predefined period of time after selection of a radial menu item during which the radial menu is displayed on the display screen, the user may be allowed to enter a predefined gesture to undo the selection in some embodiments of the invention. For example, in one embodiment, as the radial menu is fading away during the predefined time period, a predefined screen pointer event such as a mouse click, and/or a predefined stroke may undo the selection of the radial menu item.

Cascading Radial Menus

As discussed above, in a particular embodiment of the invention, between six and eight radial menu items may be placed in a radial menu. However, it is possible that the total number of radial menu items, for example, the radial menu items 222 illustrated in FIG. 2, will be greater than the total number of available pie slices in a radial menu. Some embodiments of the invention may provide cascading radial menus that may allow a plurality of radial menu items 222, greater than the number of pie slices of a single radial menu, to be displayed.

Figure 11:
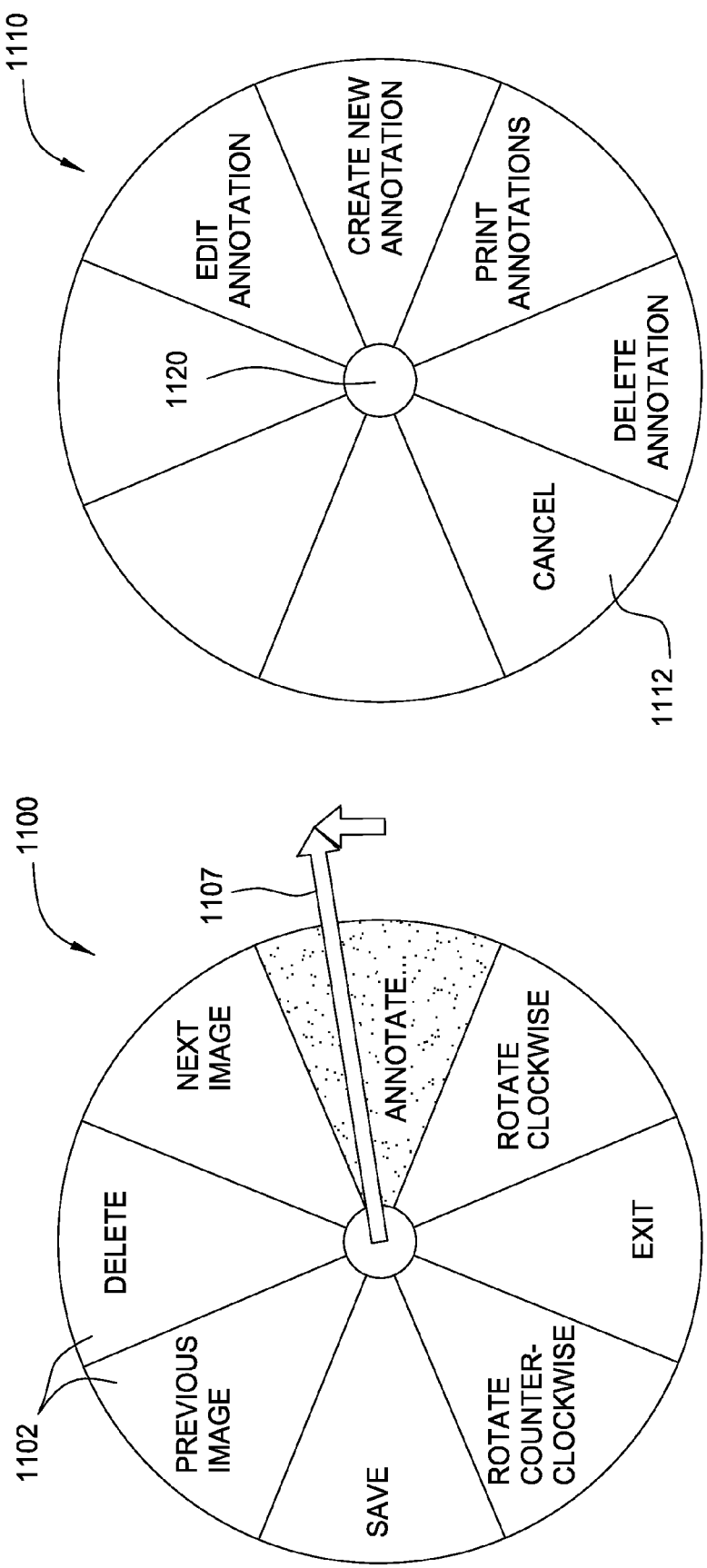
FIG. 11 illustrates cascading radial menus according to an embodiment of the invention.

FIG. 11 illustrates exemplary cascading radial menus 1100 and 1110, according to an embodiment of the invention. In one embodiment of the invention, the radial menu 1100 may be initially displayed on a display screen when a predefined screen pointer event occurs. As illustrated in FIG. 11, the radial menu 1100 may include a plurality of radial menu items 1102. In one embodiment, one or more of the radial menu items 1102 may be cascading items. Cascading items may be radial items which, when selected, result in a cascaded radial menu being displayed.

For example, the "Annotate" radial menu item in FIG. 11 may be a cascaded radial menu item. In one embodiment of the invention, the cascaded radial menu items may be distinguishable from other radial menu items. For example, in FIG. 11, ellipses (" . . . ") are provided after the word "Annotate" to indicate that the "Annotate" radial menu item 1102 is a cascading item. In alternative embodiments, any reasonable means for distinguishing cascading radial menu items, for example, different color shading of respective pie slices, different fonts, bold facing, icons, and the like, may be used to distinguish the cascading radial menu items.

In one embodiment of the invention, a cascading radial menu 1110 may be displayed when a cascading radial menu item is activated in the radial menu 1100. For example, a user may perform a first stroke to move a screen pointer into a selection zone of a cascading radial menu item, thereby activating the cascading radial menu item, as discussed above. In response to receiving the first stroke that activates the cascading radial menu item, menu manager 115 may display the cascading radial menu 1110. FIG. 11 illustrates a first stroke 1107 that activates the "Annotate" cascading radial menu item 1102, thereby resulting in the cascading radial menu 1110 being displayed.

While only two radial menus 1100 and 1110 are shown in FIG. 11, in some embodiments, any number of cascading radial menus may be displayed on the screen. For example, each successively displayed cascading radial menu may include its own cascading radial menu items which, when activated may result in a new cascading radial menu 1110 being displayed on the display screen.

In an alternative embodiment, the cascading radial menu 1110 may be displayed in response to detecting a predefined radial menu selection event. For example, in one embodiment, a first stroke may activate a cascading radial menu item 1102 in the radial menu 1100. Thereafter, upon receiving a predefined second stroke for selecting a radial menu item, the menu manager 115 may display the cascading radial menu 1110 on the display screen.

In one embodiment of the invention, the radial menu items in the cascading radial menu 1110 may be related to the selected (or activated) menu item 1102 of the radial menu. For example, referring to FIG. 11, the menu items in the cascading radial menu 1110 are related to the activated/selected "Annotate" item in radial menu 1100. Therefore, radial menu 1110 includes radial menu items such as "Create New" (Annotation), "Delete Annotation", "Edit Annotation", "Print", and the like. In alternative embodiments, the menu items in the cascading radial menu 1110 may be unrelated to the activated/selected radial menu item in radial menu 1100. For example, the radial menu may include an item "See More Menu Items". Upon activation or selection of "See More Menu Items", menu manager 115 may display a cascading radial menu with additional radial menu items.

In one embodiment of the invention, when a cascading radial menu 1110 is displayed, the radial menu 1100 may be deactivated. As a result of deactivation, the radial menu items in the radial menu 1100 may not be activated in response to movement of the screen pointer on the display screen. In other words, the movement of the screen pointer on the display screen may only activate radial menu items of the cascaded radial menu 1110, and not the radial menu 1100, upon deactivation of the radial menu 1100. In some embodiments, one or more screen pointer events may re-activate the radial menu 1100. For example, a predefined stroke, or a mouse click on the radial menu 1100 may re-activate radial menu 1100, thereby allowing activation and selection of radial menu items therein.

In one embodiment of the invention, a cascading radial menu 1110 may replace the radial menu 1100 on the display screen. This may be done, for example, to prevent a plurality of radial menus from covering large portions of the display screen. In an alternative embodiment, the cascading radial menu 1110 may be displayed on top of the radial menu 1100. In such embodiments a cancel option, for example, the cancel option 1112 illustrated in FIG. 11, may be provided to remove the cascading radial menu 1110 from the display screen and resurface the radial menu 1100 on the display screen.

In one embodiment of the invention, the menu manager 1115 may be configured to move the screen pointer, for example, a mouse pointer or a trackball pointer to a center 1120 of a cascading radial menu 1110 when the radial menu 1110 is displayed on the display screen. By moving the screen pointer to the center 1120, menu manager 115 may avoid inadvertent activation/selection of radial menu items in the cascading radial menu 1110.

In one embodiment of the invention, the menu manager 115 may be configured to display a cascading radial menu 1110 a predefined distance from the radial menu 1110. In a particular embodiment, the menu manager 115 may display the cascading radial menu 1110 such that a visible outer boundary of the radial menus 1100 and 1110 are tangent to each other. In one embodiment, the cascading radial menu 1110 may be displayed at or near a screen pointer. For example, referring to FIG. 11, the stroke 1107 may place the screen pointer 1150 at a location 1151. Accordingly, the menu manager 115 may display the cascading radial menu 1110 near the screen pointer 1150 to facilitate quick and efficient selection of items in the cascading radial menu 1110.

In some embodiments, a stroke that selects/activates a cascading radial menu item and displays a cascading radial menu may result in the screen pointer being over a selection zone of a radial menu item of the cascading radial menu 1110. Accordingly, in such embodiments, the menu manager 115 may activate the said radial menu item of the cascading radial menu. Thereafter a predefined screen pointer event for selecting a radial menu item may occur to select the said radial menu item.

Placement of Menu Items in a Radial Menu

In one embodiment of the invention, certain radial menu items may be placed at predefined locations in the radial menu. For example, the "Exit" radial menu item may always be placed in a pie slice that is vertically downwards from the center of the radial menu. By always placing the "Exit" radial menu item vertically downwards from the center of the radial menu, a user may be able to quickly and efficiently select the "Exit" radial menu item. In other words, because a gesture in the vertically downwards direction may always result in the "Exit" radial menu item being activated/selected, the user may no longer have to read the radial menu items and find the "Exit" item in the radial menu, thereby making radial menu item selection more efficient.

In one embodiment of the invention, the radial menu items 222 (See FIG. 2) may include global radial menu items and local radial menu items. Global radial menu items may include radial menu items that are displayed in all or a significant number of radial menus. For example, global radial menu items may be provided in each of an initial radial menu displayed on the screen, and one or more subsequent cascading radial menu items displayed on the screen. Exemplary global radial menu items may include, for example, "Close", "Print", "Delete", "Minimize Window", and the like.

Local radial menu items may be items that are provided only in specific radial menus. For example, in one embodiment, the local radial menu items displayed in a radial menu may depend on a screen object over which a screen pointer lies when a predefined event for displaying a radial menu is received. For example, in a video game, if the predefined screen pointer event for displaying a radial menu occurs when the screen pointer is over a gun, the displayed radial menu may include items such as "Pick up Gun", "Shoot gun", "Reload", and the like. However, if the predefined screen pointer event occurs when the screen pointer is over a vehicle, the displayed radial menu may include items such as, for example, "Enter Vehicle", "Drive Vehicle", and the like.

Figure 12A:
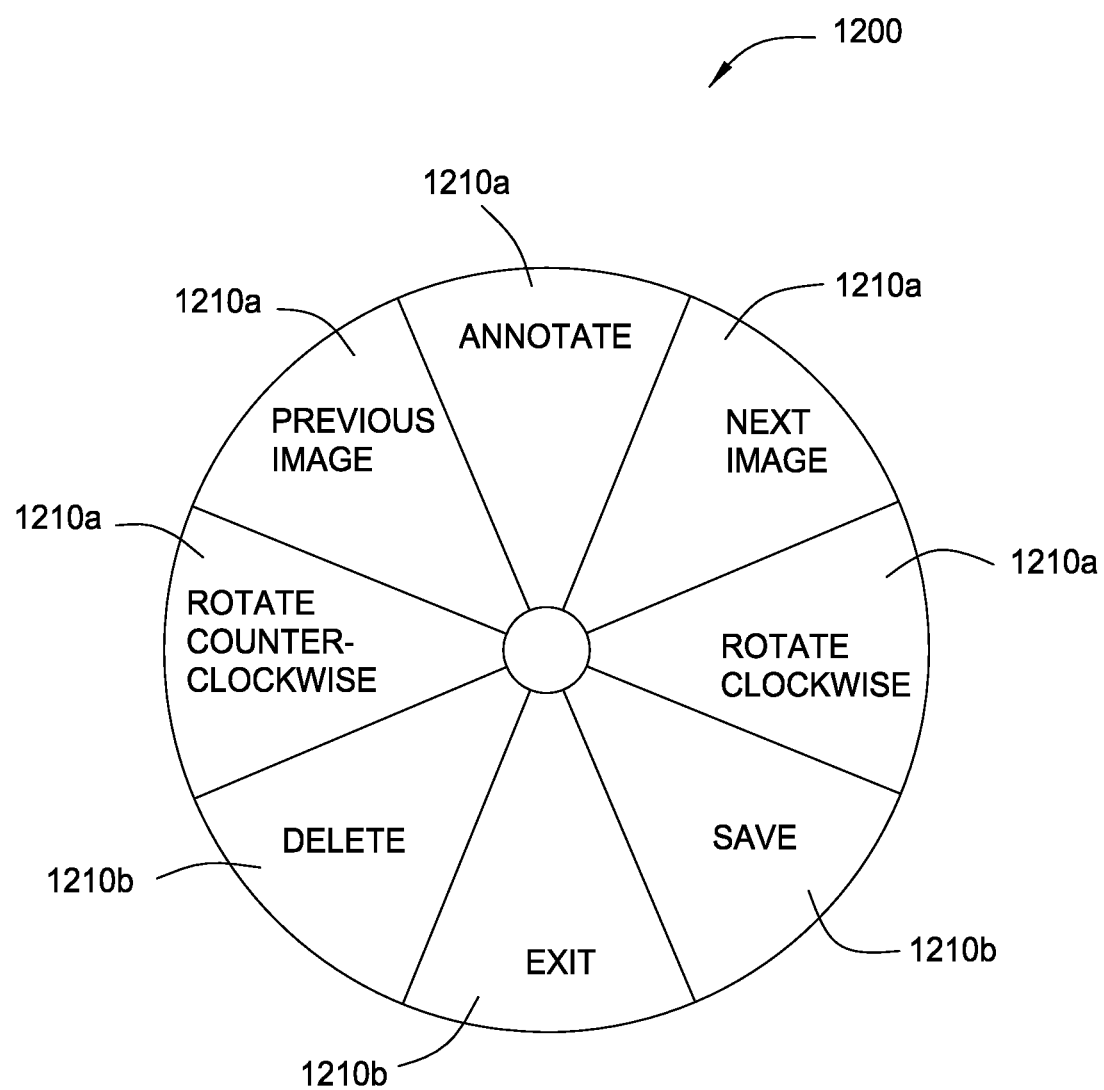
FIGS. 12A and 12B illustrate placement of radial menu items in a radial menu according to an embodiment of the invention.

FIG. 12A illustrates an exemplary radial menu 1200 comprising a plurality of local radial menu items 1210a and a plurality of global radial menu items 1220. The local radial menu items 1210a may be related to image editing. Accordingly, the local radial menu items may include, for example, "Rotate Clockwise", "Rotate Counter-Clockwise", "Previous Image", "Next Image", "Annotate", and the like. Global items 1210b such as, for example, "Save", "Exit", and "Delete" are also provided, as illustrated in FIG. 12A.

Figure 12B:
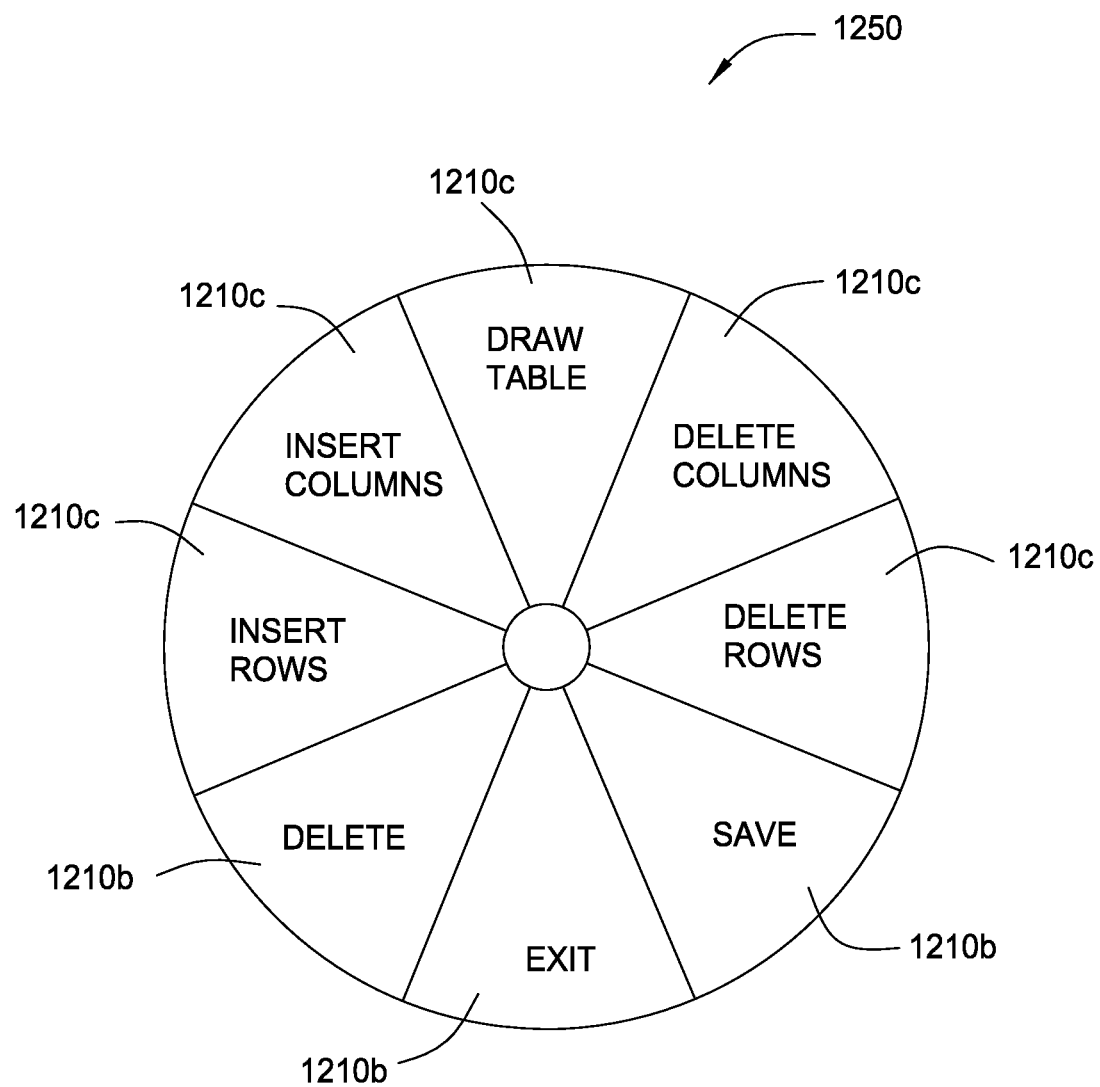

FIG. 12B, illustrates an exemplary radial menu 1250 comprising a plurality of local radial menu items 1210c and a plurality of global radial menu items 1210b. The local radial menu items 1210c may be associated with a spreadsheet application. Accordingly, the local radial menu items may include, for example, "Draw Table", "Insert Columns", "Insert Rows", "Delete Rows", "Delete Columns", and the like. Global items 1210*b* such as, for example, "Save", "Exit", and "Delete" in the radial menu 1250 are provided in the same locations (or pie slices) as the radial menu 1200, as illustrated in FIGS. 12A and 12B. Therefore, regardless of whether radial menu 1200 or 1250 is displayed, the global radial menu items may be selected using gestures moving consistently in the same direction.

In one embodiment of the invention, placement of radial menu items in a radial menu may depend on predefined relationships between the radial menu items. For example, in some cases it may be desirable to place certain radial menu items close to one another, while in other cases it may be desirable to place radial menu items away from one another. For example, it may be desirable to place radial menu items that perform opposite function away from one another to avoid erroneous selection.

In a particular embodiment, radial menu items that perform opposite functions may be placed in symmetrically opposite pie slices of the radial menu. For example, referring to the radial menu items "Previous Image" and "Next Image" in FIG. 12A are placed in symmetrically opposite radial menu pie slices because they perform opposite functions. Referring to FIG. 12B, the radial menu items "Insert Rows" and "Delete Rows" are placed diametrically opposite to one another because they perform opposite function. Any reasonable reference, for example, a horizontal axis, or a vertical axis may be used to determine symmetry.

Placing radial menu items in symmetric relationships may be desirable for several reasons. For example, symmetrically placed related radial menu items may allow users to intuitively perform opposite gestures to perform opposite functions. For example, while viewing a picture album using the radial menu item 1200 of FIG. 12A, a user may make a gesture in a first direction to select the "Next Image" radial menu item and view a next image in the album. The user may make a gesture in a symmetrically opposite direction to select the "Previous Image" radial menu item to view a previous image. Therefore, a user may be able to scan through the album using symmetrically opposite gestures without having to find a desired radial menu item each time a different image of the album is desired.

In some embodiments it may be undesirable to place certain radial menu items close to one another to avoid erroneous selection. For example, the "Delete" radial menu item may not be placed near the "Save" radial menu item so that a user doesn't inadvertently delete content by erroneously selecting the "Delete" radial menu item while making a gesture to select the "Save" radial menu item. Accordingly, it may be desirable to place the "Save" and "Delete" radial menu items as far away from each other as possible.

In some embodiments, it may be desirable to place one or more radial menu items close to one another. For example, a radial menu may include radial menu items that may belong to two different functional groups. It may be desirable in some embodiments to place the radial menu items of a particular group in close proximity to one another. For example, in one embodiment, a radial menu may include radial menu items related to an image processing application as well as a spreadsheet application. It may be desirable in this case to place the radial menu items belonging to a particular functional group in close proximity to one another.

In one embodiment of the invention, groups of radial menu items may be defined in the relationship model 223 shown in FIG. 2. FIG. 13 illustrates a table 1300 defining exemplary groups, according to an embodiment of the invention. For example, the table 1300 includes a global group, local group A, groups B-D, local group E and group F, as illustrated in FIG. 13. Each of the groups may include one or more radial menu items. The global group and local groups A and E may define global radial menu items and local radial menu items respectively, as described above.

In one embodiment of the invention, the groups defined in the table 1300 may belong to one of a plurality of group types, for example, affinity group, opposites group, repelling group, global group, local group, and the like. Affinity groups may define radial menu items that may be placed adjacent to or near one another. Group F in table 1300 defines an affinity group comprising radial menu items "Print", "Help", and "Save".

The opposites groups may define radial menu items that may be placed in symmetrically opposite pie slices of a radial menu. Groups B and C in table 1300 depict exemplary opposites groups comprising the radial menu items "Rotate Left" and "Rotate Right", and "Shrink" and "Magnify", respectively. The repelling groups may define radial menu items that cannot be placed adjacent to one another. Group D in table 1300 is an example of a repelling group including radial menu items "Save" and "Exit".

As illustrated in FIG. 13, a single radial menu item may be placed in two or more groups. For example, the radial menu item "Shrink" is a part of local group A as well as group C. Therefore, a single radial menu item may have several different relationships defined with respect to a variety of radial menu items in different groups. While the local groups A and E and the global group are shown in FIG. 13 without a type definition, in alternative embodiments, a type, for example, affinity group, may be defined for local and global groups.

In one embodiment, the relationship model 223 may include definitions of relationships between one or more groups represented in a radial menu. For example, a first group may have an affinity to a second group. Accordingly, radial menu items from the first and second groups may be placed close to one another in the radial menu. The first group may have a repelling relation with a third group. Accordingly, radial menu items from the first and third group may not be placed near one another in the radial menu.

Figure 14:
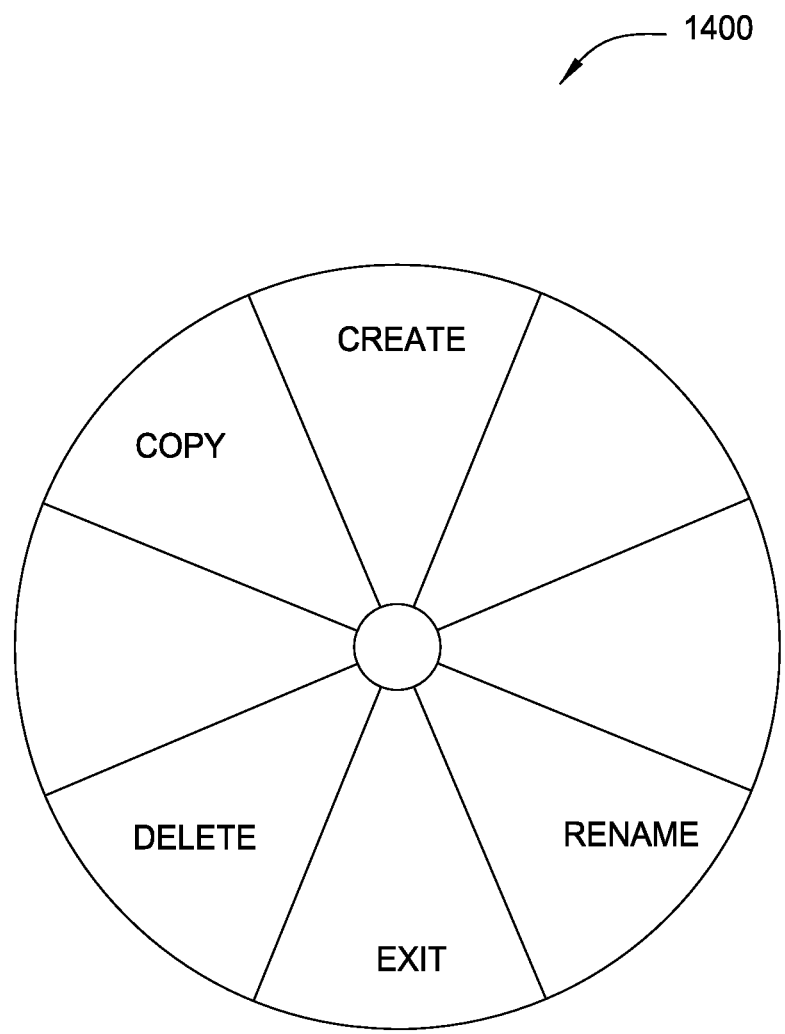
FIGS. 14 and 15A illustrate placement of groups of radial menu items in a radial menu according to an embodiment of the invention.
Figure 15A:
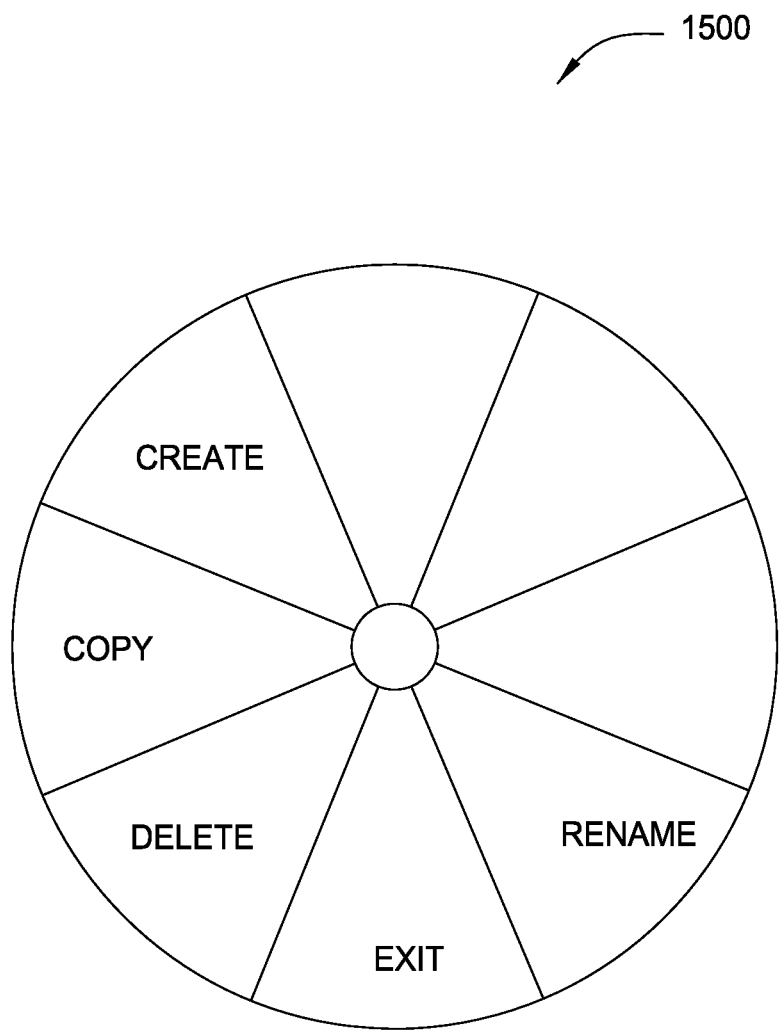

FIG. 14 illustrates placement of a first group of radial menu items and a second group of radial menu items in a radial menu 1400. The first group may include radial menu items "Copy" and "Create", and the second group may include radial menu items "Delete", "Exit", and "Rename". In one embodiment of the invention, the first group may repel the second group. Accordingly, as illustrated in FIG. 14, the radial menu items of the first group may be placed away from the radial menu items of the second group. However, if the first group were to have an affinity to the second group, the radial menu items of the first group may be placed close to the radial menu items of the second group, as illustrated in the radial menu 1500 of FIG. 15A.

Figure 15B:
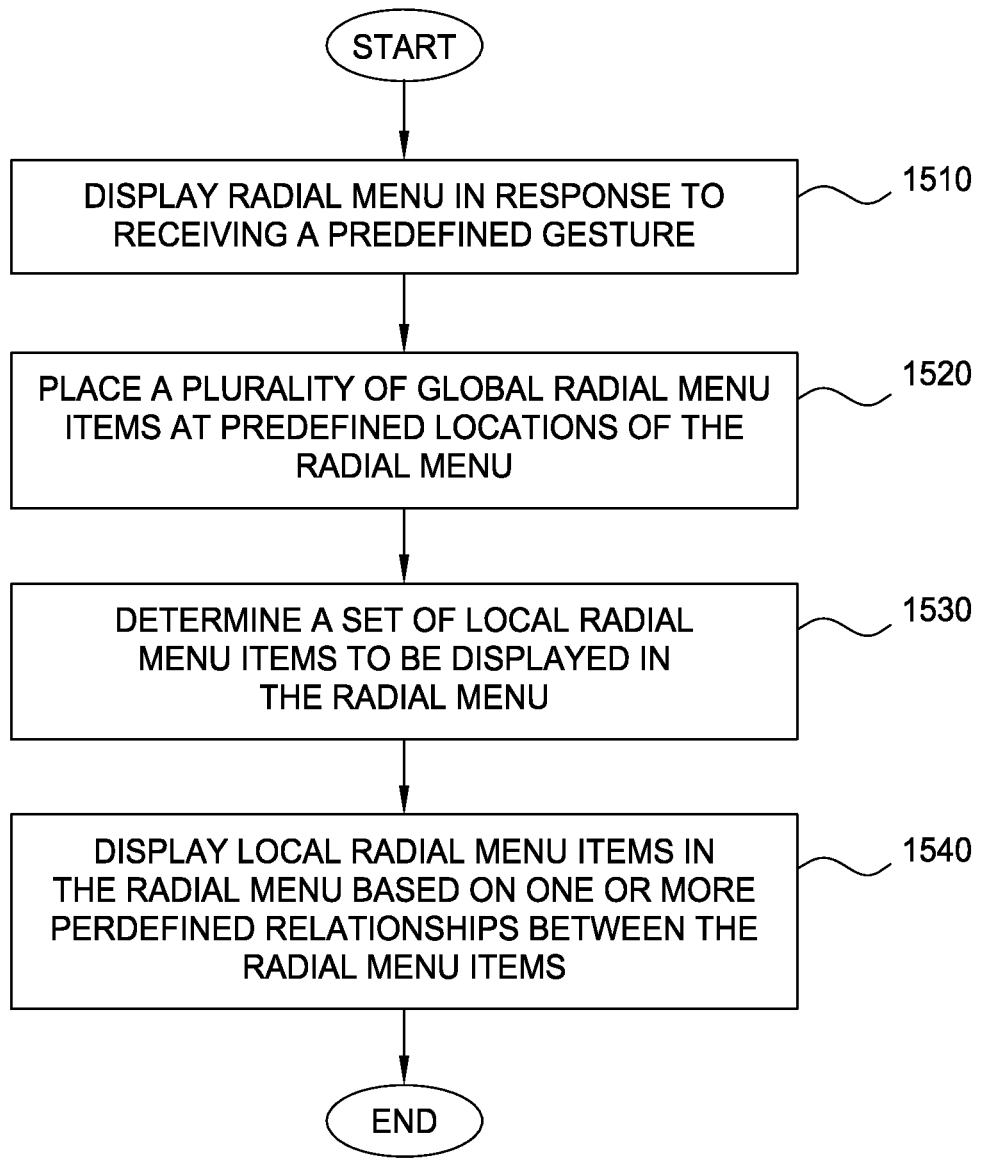
FIG. 15B is a flow diagram of exemplary operations performed to place radial menu items in a radial menu, according to an embodiment of the invention.

FIG. 15B is a flow diagram of exemplary operations performed by a menu manager 115 to place radial menu items in a radial menu. The operations may begin in step 1510 by displaying a radial menu in response to receiving a predefined gesture. In step 1520, the menu manager 115 may place a plurality of global menu items at predefined locations in the radial menu. For example, as disclosed above, the "Exit" radial menu item may be placed in a pie slice that is vertically below the center of the radial menu, as shown in FIG. 12A. In step 1530, the menu manager 115 may determine a set of local menu items that are to be displayed in the radial menu. The specific radial menu items to be displayed in the set of local menu items may depend on a variety of factors such as, for example, a location of the gesture for displaying the radial menu, an application or context in which the radial menu is generated, and the like. In step 1540, the menu manager 115 may display the set of local radial menu items in the radial menu based on one or more predefined relationships between the local or global radial menu items. For example, the menu manager 115 may refer to relationship model 223 to determine whether two or more radial menu items have a predefined relationship such as, for example, a repelling relationship, affinity relationship, or the like.

Placement of Radial Menu Items in Cascading Radial Menus

As described previously, it may be desirable to display cascading radial menus near a screen pointer to facilitate quick and efficient selection therefrom. For example, referring back to FIG. 11, the cascading radial menu 1110 is displayed on the right side of the radial menu 1100 because the gesture 1107 also moves the screen pointer to the right of the radial menu 1100.

In one embodiment of the invention, radial menu items may be placed at locations that facilitate fluid gestures for selection of radial menu items in the cascading radial menu. A gesture selecting a radial menu item from a cascading radial menu may be considered fluid if the direction of movement of the screen pointer for activating and/or selecting the radial menu item from the cascading radial menu is substantially the same as the direction of movement of the screen pointer for activating and/or selecting a radial menu item of a radial menu from which the cascading radial menu originates.

Figure 16:
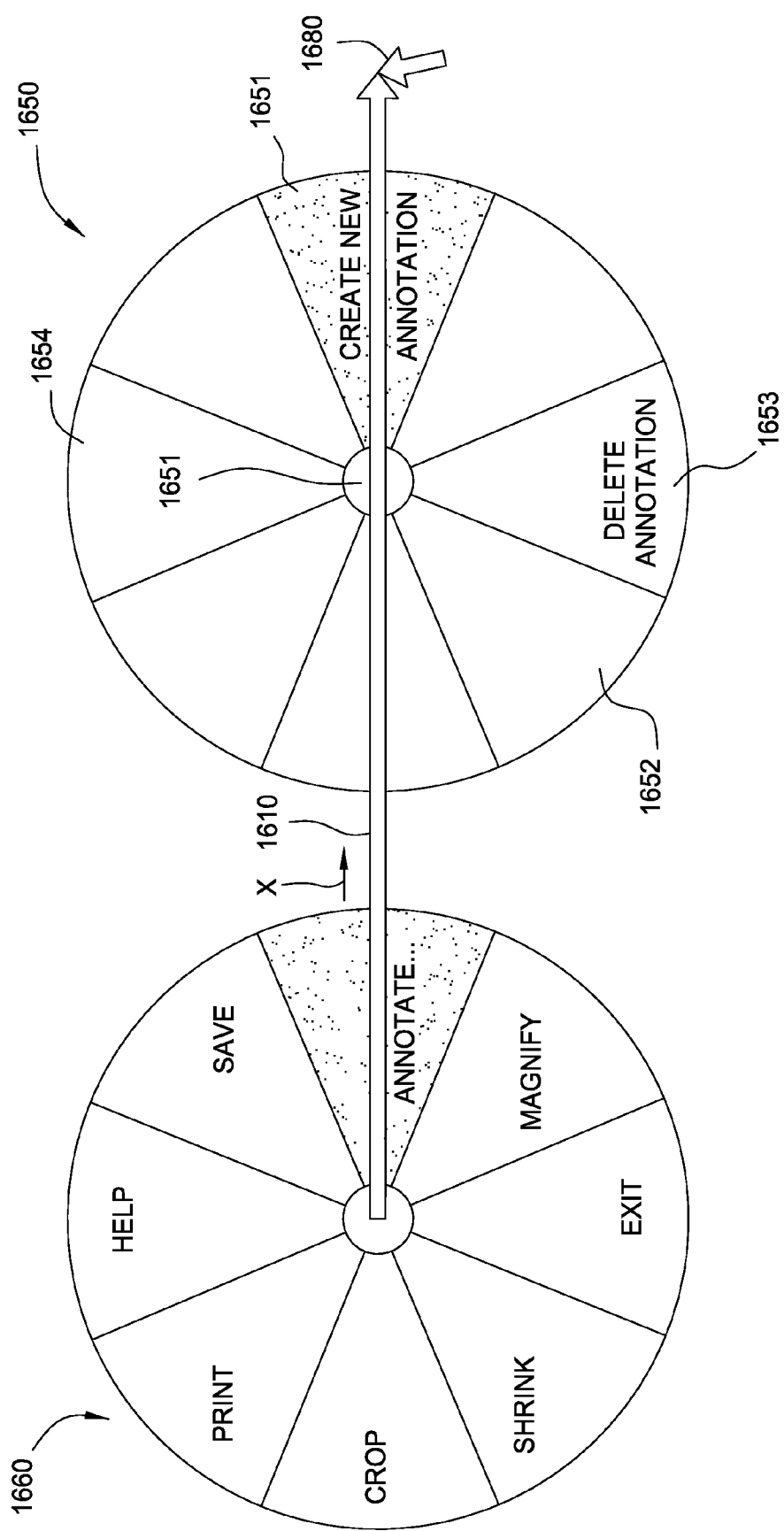
FIG. 16 illustrates an exemplary fluid gesture for selecting a radial menu item from a cascading radial menu, according to an embodiment of the invention.

Accordingly, in a particular embodiment, the placement of one or more radial menu items in a cascading radial menu may depend on a direction of movement of a screen pointer immediately prior to displaying the cascading radial menu. FIG. 16 illustrates an exemplary fluid gesture 1610 selecting a menu item in a cascading radial menu 1650. As illustrated in FIG. 16, the gesture 1610 may begin at a center 1661 of a radial menu 1660 and move the screen pointer 1680 in a direction X towards the "Annotate" radial menu item. Because the direction X moves the screen pointer 1680 to the right of the radial menu 1660, the menu manager 115 may display the cascading radial menu 1650 on the right side of the radial menu 1660, as illustrated in FIG. 16. Furthermore, because the screen pointer moves in the direction X prior to displaying the cascading radial menu 1650, menu manager 115 may determine the placement of radial menu items in the cascading radial menu 1650, based on the direction X.

In one embodiment of the invention, the placement of the radial menu items in the cascading radial menu 1650 based on the direction X may further depend on a type of the radial menu item. For example, in a particular embodiment, the placement of the radial menu item may depend on a selectability value of the radial menu item. The selectability value of a radial menu item may indicate the desired easiness of selection of the radial menu item. Any range of selectability values may be defined in one embodiment. For example, the selectability values may have a range of 1-10, wherein a selectability value of 1 indicates that the greatest difficulty of selection is desired, and a selectability value of 10 indicates that the least difficulty of selection is desired for the radial menu item. While numerical selectability values are described herein, in alternative embodiments, the selectability value may be of any other reasonable type. For example, in one embodiment, the selectability value may be a boolean value, e.g., easy or difficult.

In the following examples, the terms "higher selectability value" and "lower selectability value" are used in reference to the selectability values of radial menu items. For purposes of this specification, a higher selectability value is assumed to indicate lower difficulty in selecting an associated radial menu item, and a lower selectability value is assumed to indicate a greater difficulty in selecting an associated radial menu item. However, in alternative embodiments, the opposite may be true. I.e., a higher selectability value may indicate greater difficulty in selecting an associated radial menu item, and a lower selectability value indicates a lower difficulty in selecting an associated radial menu item.

The selectability values of the radial menu items may be defined in the user preferences 221 in one embodiment of the invention, and therefore, may be modified by a user. In alternative embodiments, the selectability value may be determined based on historic selection of the radial menu items 222. In such embodiments, the menu manager 215 may be configured to maintain the historic selection data for each of the radial menu items 222 and compute a selectability value for each item based on the historic selection data.

While determining selectability values based on historic selection data, probability of selection, the nature of a function associated with the radial menu item, and the like are disclosed herein, in alternative embodiments, any criteria may be used to determine the selectability value. Exemplary criteria may include, for example, the length of time associated with execution of a function associated with a radial menu item, a corresponding expense, reversibility of the function, safety of execution of the function, and the like.

As illustrated in FIG. 16, the cascading radial menu 1660 includes two radial menu items: "Create New Annotation" and "Delete Annotation". In one embodiment, the "Create New Annotation" radial menu item may have a higher selectability value than the "Delete Annotation" radial menu item. Accordingly, it may be desirable to allow activation and/or selection of the "Create New Annotation" radial menu item using a fluid gesture. Therefore, the menu manager 215 may place the "Create New Annotation" radial menu item in a pie slice that is aligned with the direction X. For example, in FIG. 16, the "Create New Annotation" radial menu item is placed in pie slice 1651. As can be seen in FIG. 16, the pie slice 1651 is substantially aligned with the direction X. Therefore, the "Annotate" radial menu item in the radial menu 1660 and the "Create Annotation" radial menu item in the cascading radial menu 1650 may be activated and/or selected using a gesture 1610 that moves the screen pointer substantially in the direction X, i.e. a fluid gesture. In an alternative embodiment, the "Create New Annotation" radial menu item may also be placed in the pie slice 1652, which is also substantially aligned with the direction X.

Because the "Delete Annotation" radial menu item may have a low selectability value, the "Delete Annotation" radial menu item may be placed in a pie slice that is substantially orthogonal to the direction X. For example, the "Delete Annotation" radial menu item is shown in pie slice 1653, which is substantially orthogonal to the direction X, as shown in FIG. 16. Alternatively, the "Delete Annotation" radial menu item may also be placed in pie slice 1654, which is also substantially orthogonal to the direction X.

In one embodiment, if a plurality of radial menu items are to be placed in a cascading radial menu 1650, the menu manager 115 may place the radial menu items with the highest selectability values in the pie slices that are substantially aligned with a direction of movement of the screen pointer prior to displaying the cascading radial menu. The radial menu items with the lowest selectability values may be placed in the pie sliced that are substantially orthogonal to the direction of movement of the screen pointer prior to displaying the cascading radial menu. Remaining radial menu items may be placed in pie slices that are adjacent to the substantially aligned and substantially orthogonal pie slices based on their selectability values. For example, the higher the selectability value of a radial menu item, the greater may be the likelihood of placing the radial menu item in a pie slice that is adjacent to a pie slice that is aligned with the direction of movement of the screen pointer prior to displaying the cascading radial menu.

In some embodiments, while selecting a radial menu item from the radial menu 1660, the screen pointer may be moved in a plurality of different directions before a desired radial menu item is activated and/or selected. Accordingly, in some embodiments, the menu manager may be configured to determine a direction of movement of the screen pointer 1680 immediately prior to displaying a cascading radial menu upon activation and/or selection of a radial menu item from the radial menu 1660. The menu manager may determine a projected path of movement of the screen pointer 1680 based on the direction of movement of the screen pointer immediately prior to displaying the cascading radial menu. The location for displaying the cascading radial menu and the location of radial menu items therein may depend on the projected path determined by the menu manager 115. The projected path of the screen pointer computed by the menu manager 115 is not limited to a straight line path. In some embodiments, the path may be a curved path, meandering path, zig-zag path, or the like.

Figure 17:
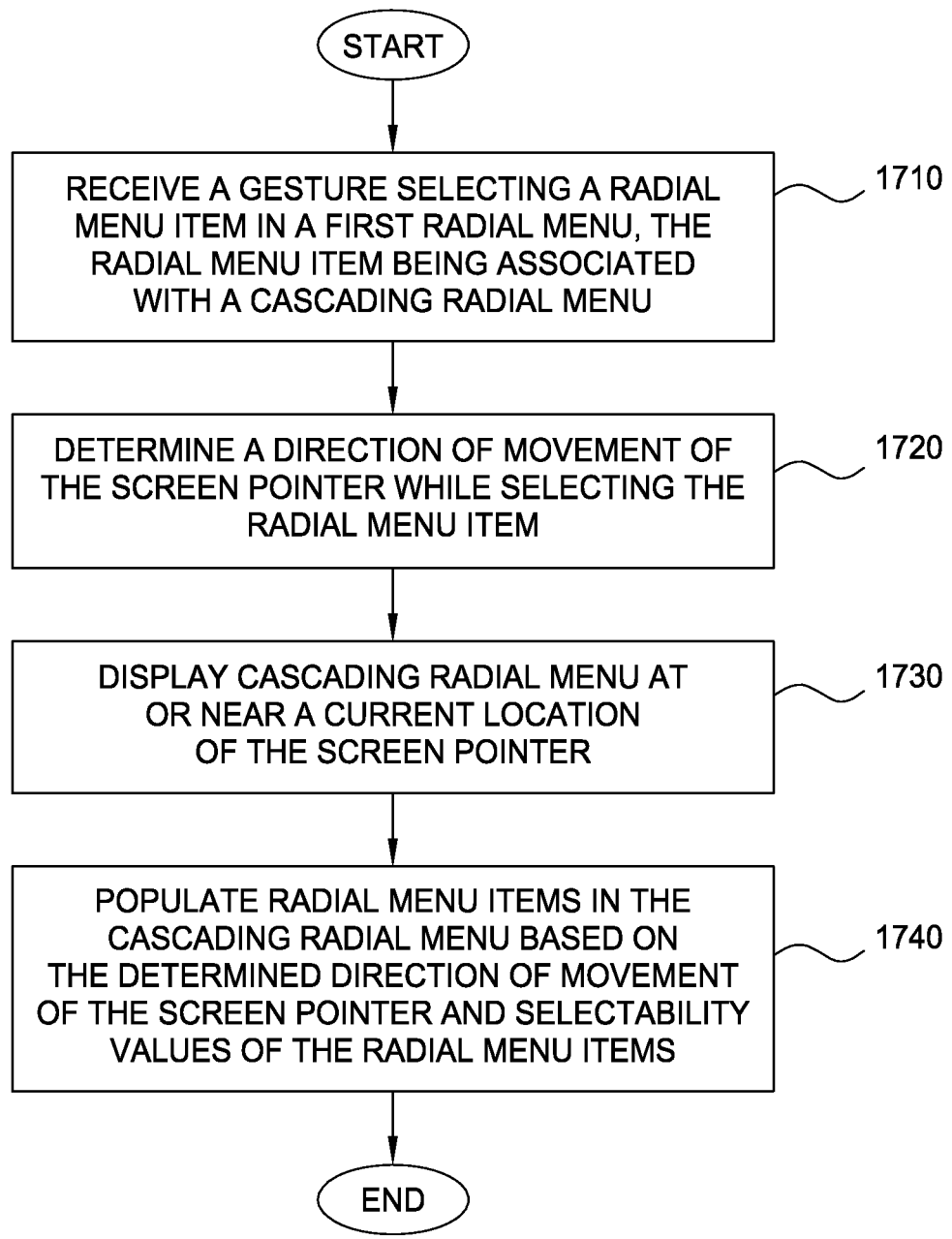
FIG. 17 is a flow diagram of exemplary operations performed to display radial menu items in a cascading radial menu, according to an embodiment of the invention.

FIG. 17 is a flow diagram of exemplary operations performed by a menu manager for placing radial menu items in a cascading radial menu. The operations may begin in step 1710 by receiving a gesture selecting a radial menu item in a first radial menu, wherein the radial menu item is associated with a cascading radial menu. In step 1720, the menu manager may determine a direction of movement of the screen pointer while selecting the radial menu item. In step 1730, the menu manager may display a cascading radial menu item at or near a location of the screen pointer. In step 1740, the menu manager may populate radial menu items in the cascading radial menu based on the determined direction of movement of the screen pointer and selectability values of the radial menu items.

By displaying radial menu items in radial menus and cascading radial menus items in a way that facilitates fast, intuitive, and fluid gestures, embodiments of the invention facilitate quick and efficient selection of items from radial menus.

While the foregoing is directed to embodiments of the present invention, other and further embodiments of the invention may be devised without departing from the basic scope thereof, and the scope thereof is determined by the claims that follow.

What is claimed is:

1. A computer implemented method for displaying radial menu items in a radial menu, comprising configuring one or more processors to perform an operation comprising:

maintaining a set of radial menu item group definitions, each of the group definitions including an identifier, a list of radial menu items in an associated group, and relationships between the radial menu items in the group and other radial menu items within and/or outside the group, wherein the relationships include one or more of an affinity relationship specifying radial menu items are to be placed circumferentially adjacent to one another in the radial menu, an opposite relationship specifying radial menu items are to be placed in circumferentially opposite locations in the radial menu, or a repelling relationship specifying radial menu items are not to be placed circumferentially adjacent to one another in the radial menu, and wherein at least a first group of radial menu items and a second group of radial menu items are functional groups and are associated with a relationship specifying placement of the radial menu items of the first group in relation to the radial menu items of the second group in the radial menu, in response to receiving a predefined gesture, displaying the radial menu based on one or more of the radial menu item group definitions, wherein the originally displayed radial menu includes:

a first set of radial menu items, each of the radial menu items in the first set being displayed at a respective location in the radial menu, and a second set of radial menu items, each of the radial menu items in the second set being displayed at a circumferential location dynamically determined with respect to other radial menu items based on one or more of the radial menu item group definitions associated with the second set of radial menu items and specifying relationships between radial menu items in the second set and other radial menu items in the first set and/or the second set.

2. The method of claim 1, wherein the second set of radial menu items comprises at least a first subset of radial menu items and a second subset of radial menu items, wherein placement of the first subset of radial menu items and the second subset of radial menu items in the radial menu is determined based on a relationship in one of the radial menu item group definitions between the first subset of radial menu items and the second subset of radial menu items.

3. The method of claim 2, wherein the relationship between the first subset of radial menu items and the second subset of radial menu items indicates that the first subset of radial menu items and the second subset of radial menu items should be placed in close proximity to each other in the radial menu.

4. The method of claim 2, wherein the relationship between the first subset of radial menu items and the second subset of radial menu items indicates that the first subset of radial menu items and the second subset of radial menu items should not be placed in close proximity to each other in the radial menu.

5. A non-transitory computer readable storage medium comprising a program product which, when executed, is configured to perform an operation for displaying radial menu items in a radial menu, comprising:

maintaining a set of radial menu item group definitions, each of the group definitions including an identifier, a list of radial menu items in an associated group, and relationships between the radial menu items in the group and other radial menu items within and/or outside the group, wherein the relationships include one or more of an affinity relationship specifying radial menu items are to be placed circumferentially adjacent to one another in the radial menu, an opposite relationship specifying radial menu items are to be placed in circumferentially opposite locations in the radial menu, or a repelling relationship specifying radial menu items are not to be placed circumferentially adjacent to one another in the radial menu, and wherein at least a first group of radial menu items and a second group of radial menu items are functional groups and are associated with a relationship specifying placement of the radial menu items of the first group in relation to the radial menu items of the second group in the radial menu;

in response to receiving a predefined gesture, displaying the radial menu based on one or more of the radial menu item group definitions, wherein the originally displayed radial menu includes:

a first set of radial menu items, each of the radial menu items in the first set being displayed at a respective location in the radial menu, and a second set of radial menu items, each of the radial menu items in the second set being displayed at a circumferential location dynamically determined with respect to other radial menu items based on one or more of the radial menu item group definitions associated with the second set of radial menu items and specifying relationships between radial menu items in the second set and other radial menu items in the first set and/or the second set.

6. The non-transitory computer readable storage medium of claim 5, wherein the second set of radial menu items comprises at least a first subset of radial menu items and a second subset of radial menu items, wherein placement of the first subset of radial menu items and the second subset of radial menu items in the radial menu is determined based on a relationship in one of the radial menu item group definitions between the first subset of radial menu items and the second subset of radial menu items.

7. The non-transitory computer readable storage medium of claim 6, wherein the relationship between the first subset of radial menu items and the second subset of radial menu items indicates that the first subset of radial menu items and the second subset of radial menu items should be placed in close proximity to each other in the radial menu.

8. The non-transitory computer readable storage medium of claim 6, wherein the relationship between the first subset of radial menu items and the second subset of radial menu items indicates that the first subset of radial menu items and the second subset of radial menu items should not be placed in close proximity to each other in the radial menu.

9. A system, comprising:
a memory comprising a program; and
a processor which, when executing the program, is configured to:

maintain a set of radial menu item group definitions, each of the group definitions including an identifier, a list of radial menu items in an associated group, and relationships between the radial menu items in the group and other radial menu items within and/or outside the group, wherein the relationships include one or more of an affinity relationship specifying radial menu items are to be placed circumferentially adjacent to one another in the radial menu, an opposite relationship specifying radial menu items are to be placed in circumferentially opposite locations in the radial menu, or a repelling relationship specifying radial menu items are not to be placed circumferentially adjacent to one another in the radial menu, and wherein at least a first group of radial menu items and a second group of radial menu items are functional groups and are associated with a relationship specifying placement of the radial menu items of the first group in relation to the radial menu items of the second group in the radial menu, in response to receiving a predefined gesture, display the radial menu based on one or more of the radial menu item group definitions, wherein the originally displayed radial menu includes:

a first set of radial menu items, each of the radial menu items in the first set being displayed at a respective location in the radial menu; and a second set of radial menu items, each of the radial menu items in the second set being displayed at a circumferential location dynamically determined with respect to other radial menu items based on one or more of the radial menu item group definitions associated with the second set of radial menu items and specifying relationships between radial menu items in the second set and other radial menu items in the first set and/or the second set.

* * * * *